(12) United States Patent
Craske et al.

(10) Patent No.: US 12,730,638 B2
(45) Date of Patent: Sep. 8, 2026

(54) EXCEPTION RETURN STATE LOCK PARAMETER

(71) Applicant: Arm Limited, Cambridge (GB)

(72) Inventors: Simon John Craske, Cambridge (GB); John Michael Horley, Hauxton (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 18/859,256

(22) PCT Filed: Mar. 17, 2023

(86) PCT No.: PCT/GB2023/050653
§ 371 (c)(1),
(2) Date: Oct. 23, 2024

(87) PCT Pub. No.: WO2023/209323
PCT Pub. Date: Nov. 2, 2023

(65) Prior Publication Data

US 2025/0284495 A1 Sep. 11, 2025

(30) Foreign Application Priority Data

Apr. 28, 2022 (GB) ..................................... 2206164

(51) Int. Cl.
*G06F 9/30* (2018.01)

(52) U.S. Cl.
CPC ........ *G06F 9/30134* (2013.01); *G06F 9/3004* (2013.01); *G06F 9/30101* (2013.01)

(58) Field of Classification Search
CPC . G06F 9/30134; G06F 9/3004; G06F 9/30101
See application file for complete search history.

(56) References Cited

U.S. PATENT DOCUMENTS 7,581,089 B1 * 8/2009 White .................... G06F 21/54 712/242
9,239,801 B2 * 1/2016 Patel ...................... G06F 21/52
(Continued)

OTHER PUBLICATIONS

International Search report and the written opinion for International Application No. PCT/GB2023/050653, dated Jun. 22, 2023.
(Continued)

*Primary Examiner* — Corey S Faherty
(74) *Attorney, Agent, or Firm* — NIXON & VANDERHYE P.C.

(57) ABSTRACT

An apparatus comprises exception return state register storage, and processing circuitry. In response to a guarded control stack (GCS) exception return state push instruction, the processing circuitry obtains exception return state information from the exception return state register storage and push the state information to a GCS data structure. In response to a GCS exception return state pop instruction, the processing circuitry obtains GCS-protected exception return state information from the GCS data structure. In at least one operating state, the processing circuitry detects, in response to an attempt to modify the exception return state information stored in the exception return state register storage, whether an exception return state lock parameter is in a locked state or an unlocked state, and signals a fault when it is in the locked state.

17 Claims, 12 Drawing Sheets

(56) References Cited

U.S. PATENT DOCUMENTS

| | | | | |
|---|---|---|---|---|
| 9,390,264 | B2 * | 7/2016 | Acar | G06F 21/56 |
| 9,501,637 | B2 * | 11/2016 | LeMay | G06F 9/45533 |
| 10,768,937 | B2 * | 9/2020 | Evers | G06F 9/3016 |
| 11,294,682 | B2 * | 4/2022 | Niu | G06F 9/3806 |
| 2010/0088705 | A1 | 4/2010 | Attinella et al. | |
| 2018/0088949 | A1 | 3/2018 | Duvalsaint et al. | |
| 2018/0088988 | A1 * | 3/2018 | Rabet | G06F 21/126 |
| 2020/0371966 | A1 | 11/2020 | Parker et al. | |
| 2021/0303681 | A1 * | 9/2021 | Lin | G06F 21/52 |

OTHER PUBLICATIONS

International Search Report for GB2206134.2, dated Nov. 25, 2022.
Bedichek, "Some Efficient Architecture Simulation Techniques," Department of Computer Science, FR-35 University of Washington, Seattle, Washington 98195.
Shanbhogue et al., "Security Analysis of Processor Instruction Set Architecture for Enforcing Control-Flow Integrity," 2019.
Office Action for IN Application No. 202417081053 dated Apr. 6, 2026, 7 pages.

* cited by examiner

Virtual Address Space
Peripherals
Kernel
Application
Translation Tables
Stage 1 Tables
What the OS think is the Physical Address Space
DDR
Peripherals
Flash
Translation Tables
Stage 2 Tables
Physical Address Space
DDR
Peripherals
Flash
SRAM
ROM

EXCEPTION RETURN STATE LOCK PARAMETER

The present technique relates the field of data processing.

A data processing apparatus can save exception return state information in response to taking an exception. The exception return state information indicates the processor state at the time of taking an exception, so that when the exception handling is finished, the processor can return to the processing being performed before the exception was taken.

At least some examples provide an apparatus comprising: exception return state register storage to store exception return state information; and processing circuitry to perform processing operations in response to instructions; in which: in response to a guarded control stack (GCS) exception return state push instruction, the processing circuitry is configured to obtain the exception return state information from the exception return state register storage and push the exception return state information to a GCS data structure; in response to a GCS exception return state pop instruction, the processing circuitry is configured to obtain GCS-protected exception return state information from the GCS data structure; the apparatus comprises memory management circuitry to reject a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one operating state of the processing circuitry, the processing circuitry is configured to detect, in response to an attempt to modify the exception return state information stored in the exception return state register storage, whether an exception return state lock parameter is in a locked state or an unlocked state, and to signal a fault when the exception return state lock parameter is detected to be in the locked state.

At least some examples provide a method comprising storing exception return state information in exception return state register storage; and using processing circuitry, performing processing operations in response to instructions; in response to a guarded control stack (GCS) exception return state push instruction, obtaining the exception return state information from the exception return state register storage and pushing the exception return state information to a GCS data structure; in response to a GCS exception return state pop instruction, obtaining GCS-protected exception return state information from the GCS data structure; rejecting a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one operating state of the processing circuitry, detecting, in response to an attempt to modify the exception return state information stored in the exception return state register storage, whether an exception return state lock parameter is in a locked state or an unlocked state, and signaling a fault when the exception return state lock parameter is detected to be in the locked state.

At least some examples provide a computer program comprising instructions which, when executed by a host data processing apparatus, control the host data processing apparatus to provide an instruction execution environment for executing target code, the computer program comprising: register emulating program logic to control the host data processing apparatus to simulate exception return state register storage for storing exception return state information; and processing program logic to control the host data processing apparatus to simulate execution of instructions of the target code; in which: in response to a guarded control stack (GCS) exception return state push instruction of the target code, the processing program logic is configured to control the host data processing apparatus to obtain the exception return state information from the simulated exception return state register storage and push the exception return state information to a GCS data structure; in response to a GCS exception return state pop instruction of the target code, the processing program logic is configured to obtain GCS-protected exception return state information obtained from the GCS data structure; the computer program comprises memory management program logic to reject a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one simulated operating state of the processing program logic, the processing program logic is configured to control the host data processing apparatus to detect, in response to an attempt to modify the exception return state information stored in the simulated exception return state register storage, whether an exception return state lock parameter is in a locked state or an unlocked state, and to signal a fault when the exception return state lock parameter is detected to be in the locked state.

The computer program may be stored on a storage medium. The storage medium may be a non-transitory storage medium.

Further aspects, features and advantages of the present technique will be apparent from the following description of examples, which is to be read in conjunction with the accompanying drawings, in which.

Figure 1:
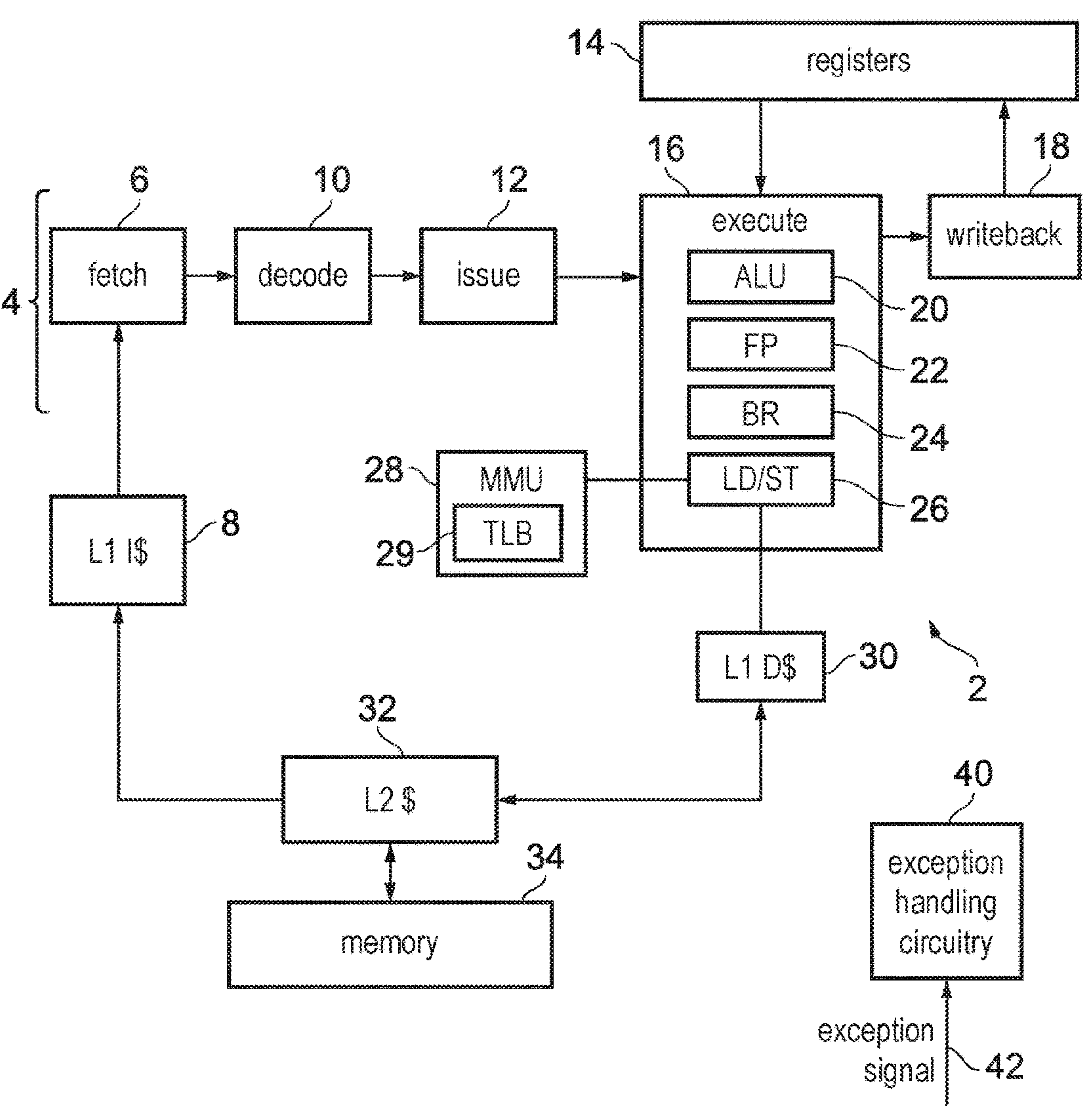
FIG. 1 illustrates an example of a data processing apparatus having processing circuitry and memory management circuitry.

An apparatus has exception return state register storage to store exception return state information, and processing circuitry to perform processing operations in response to instructions.

Return-oriented-programming (ROP) based attacks are a common class of attacks on data processing systems. ROP attacks are attacks which attempt to cause a program to behave in an unexpected manner by corrupting the return state information used to return from a function call or an exception. Often software will save return state information to memory, e.g. to facilitate nesting of function calls or exceptions, where return state information for an outer function call or exception (of a nested set of function calls or exceptions) is saved to memory to preserve it before it can be overwritten in registers with return state information for an inner function call or exception. A successful ROP attack can cause the function return or exception return to return program flow to an instruction other than the next instruction after the point at which the function was called or the exception was taken, which can allow the attacker to control the processing circuitry to perform arbitrary operations other than the sequence of operations intended by the programmer.

To guard against ROP based attacks tampering with exception return state information, it can be useful to provide a guarded control stack (GCS) data structure used to protect the return state information for returning from an exception. In response to a guarded control stack (GCS) exception return state push instruction, the processing circuitry obtains the exception return state information from the exception return state register storage and pushes the exception return state information to a GCS data structure. In response to a GCS exception return state pop instruction, the processing circuitry obtains GCS-protected exception return state from the GCS data structure. Protection for the GCS data structure can be provided by memory management circuitry which supports specifying a memory region as being a GCS region intended for storing the GCS data structure. The memory management circuitry rejects write requests specifying a target address in response to determining that the memory region corresponding to the target address is specified as a GCS region, when the write request is a request other than a GCS memory access request triggered by one of a restricted subset of GCS-accessing types of instruction (the restricted subset of GCS-accessing types of instruction includes at least the GCS exception return state push instruction). Hence, a protected region of memory can be defined which cannot be written by all types of write request (e.g. general purpose (not GCS-specific) store instructions can be excluded from the restricted subset of GCS-accessing types of instruction). This limits the attack surface available for an attacker to try to corrupt the GCS-protected exception return state stored in the GCS data structure. Hence, stronger protection can be provided for exception return state than is possible using general purpose stacks maintained by software in a standard readable/writeable memory region.

However, the inventors recognised that there can be a window of time between an exception entry (when the exception return state is captured in the exception return state register storage) and execution of the GCS exception return state push instruction, and another window of time between execution of the GCS exception return state pop instruction and an exception return, when the exception return state information may be vulnerable to tampering in registers, which if successful could circumvent the check based on the protected exception return state information stored in the GCS data structure. If an attacker can modify the exception return state in the exception return state register storage between the exception entry and the execution of the GCS exception return state push instruction, then the wrong exception return state may be pushed to the GCS data structure and so incorrectly regarded as trusted on the GCS data structure. Similarly, some attacks could be based on modifying exception return state in the exception return state register storage after execution of the GCS exception return state pop instruction but before the execution of an exception return.

One approach for addressing this problem could be to require that the operations of the GCS exception return state push instruction are instead performed in hardware in response to exception entry itself, and that the operations of the GCS exception return state pop instruction are performed in response to the same instruction that triggers an exception return, to eliminate these windows of time. However, this approach may increase the number of operations that are required to be triggered by a single event (exception entry and return). Such overloading of the actions required in response to a single trigger event can make it much more complex for a processor microarchitecture designer to implement the circuit hardware for supporting these operations while meeting circuit timing requirements. Also, separating the GCS exception return state push instruction from the exception entry and the GCS exception return state pop instruction from the exception return also has an advantage that there is more flexibility for software to determine which exception entry/return events to protect or not protect, so it may not be desired to combine these operations.

In the examples discussed below, an exception return state lock parameter is provided which can be set to a locked state or an unlocked state. In at least one operating state of the processing circuitry, the processing circuitry detects, in response to an attempt to modify the exception return state information stored in the exception return state register storage, whether the exception return state lock parameter is in the locked state or the unlocked state, and signals a fault when the exception return state lock parameter is detected to be in the locked state. By providing an architectural mechanism to lock the exception return state information to prevent it being modified, this can prevent tampering with the exception return state information in the windows between exception entry and the push of exception return state to the GCS data structure and between popping of the GCS-protected exception return state information and the subsequent exception return, to improve the security provided by the GCS-based check of exception return state information.

The processing circuitry may support execution of instructions in one of a number of exception levels associated with different levels of privilege. In the at least one operating state of the processing circuitry, the processing circuitry may set the exception return state lock parameter to the locked state in response to an exception being taken for which the exception is to be taken at a same exception level as a current exception level before the exception is taken. Hence, for an exception to be taken in the same exception level as the processing executing before the exception is taken, exception entry may cause the processing circuitry to lock the exception return state information against modification, to protect against tampering with the exception return state information captured in response to the exception entry, before the captured exception return state information can be pushed to the GCS data structure. The setting of the exception return state lock parameter to the locked state may occur automatically in response to the exception being taken, without needing an explicit software instruction to be executed after exception entry to set the exception return state lock parameter to the locked state.

It is not essential to set the exception return state lock parameter to the locked state in response to an exception entry for which the exception is to be taken in a more privileged exception level than the exception level which was current before the exception is taken. Where an exception is taken to a more privileged level, the more privileged exception handling code can be trusted to manage the exception return appropriately. Attacks are more likely when an exception is taken to the same exception level. Nevertheless, other implementations could choose to also lock exception return state information when taking an exception to a more privileged exception level.

In the at least one operating state of the processing circuitry, the processing circuitry may set the exception return state lock parameter to the unlocked state in response to the GCS exception return state push instruction. Hence, once the exception return state information has been pushed to the GCS data structure then there is no longer a need to prevent modification of the exception return state information in the exception return state register storage, and so by switching the lock parameter to the unlocked state, this allows subsequent operations which may validly need to change the information in the exception return state register storage to proceed. Unlocking the exception return state lock parameter in response to the GCS exception return state push instruction also helps to improve security by allowing detection of cases when an instruction (e.g. an exception return instruction) executed at a time when the exception return state modification should be locked is executed in an incorrect sequence of program flow at a time when the exception return state modification is currently unlocked.

In the at least one operating state of the processing circuitry, the processing circuitry may set the exception return state lock parameter to the locked state in response to the GCS exception return state pop instruction. The GCS exception return state pop instruction may mark the start of the window where the exception return state popped from the GCS data structure is vulnerable to tampering, so locking the exception return state in response to the GCS exception return state pop instruction helps give confidence that on a subsequent exception return the exception return state information used for the exception return is still the same as what was obtained from the GCS data structure.

In the at least one operating state of the processing circuitry, the processing circuitry may check, in response to an exception return instruction for triggering an exception return based on the exception return state information stored in the exception return state register storage, for which the exception return is a return to processing at a same exception level as a current exception level before the exception return, whether the exception return state lock parameter is set to the locked state, and signal a fault in response to detecting that the exception return state lock parameter is set to the unlocked state. This can help to protect against attacks which may attempt to control program flow to cause an exception return instruction to be executed without first having obtained the GCS-protected exception return state information using the GCS exception return state pop instruction.

Different approaches can be taken to determining whether a fault should be signaled when an instruction is executed which could cause a modification of information in the exception return state register storage when the exception return state lock parameter is set the locked state.

In one example, in the at least one operating state of the processing circuitry, the processing circuitry may signal a fault in response to an attempt to execute an instruction requesting a modification to information in the exception return state register storage when the exception return state lock parameter is set to the locked state, independent of whether a new value to be written to the exception return state register storage is the same or different to an old value previously stored in the exception return state register storage. Hence, in this case the fault would be signaled if an instruction attempts to modify the information in the exception return state register storage when such modification is locked, even if the new value to be written by the instruction would have been the same as the old value previously stored in the exception return state register storage. Although if the new value is the same as the old value, there is no modification of the exception return state information, it can be simpler (from the point of view of a hardware designer seeking to implement the control circuit logic for controlling the signaling of the fault depending on the exception return state lock parameter) to make the signaling of the fault independent of any comparison between the old and new values, as there is no need to read the value currently stored in the exception return state register storage to decide whether to trigger a fault.

In another example, in the at least one operating state of the processing circuitry, in response to an attempt to execute an instruction requesting a modification to information in the exception return state register storage when the exception return state lock parameter is set to the locked state, the processing circuitry may check whether a new value to be written to the exception return state register storage is the same or different to an old value previously stored in the exception return state register storage, and signal the fault when the new value is determined to differ from the old value. This approach could be useful to speed up processing of some fast exception code paths for which the exception handler is so short that it is unnecessary to save/restore exception return state to/from a stack in memory. In this case, the exception handler may prefer not to execute any GCS exception return state push/pop instructions as the originally captured exception return state may remain in the exception return state register storage throughout the execution of the exception handler. This may mean that the exception return state lock parameter may remain in the locked state throughout the exception handler. There may be some legitimate reasons why the exception handler may nevertheless attempt to modify the exception return state register storage. Although a fault should therefore be triggered if there is an attempt to modify the exception return state information stored in the exception return state register storage while the lock parameter is in the locked state, sometimes the attempted modification may in fact write the same value that was already stored in the exception return state register storage, in which case there is no risk in the exception return state becoming corrupted. For example, this could occur if, although there was no intent to change the exception return state information due to being in the fast exception code path as discussed above, the exception handler code includes a common code path which is shared with other use cases where the exception return state information does need to be modified, and it is preferred (to speed up performance by avoiding conditional branches, say) to execute the instruction that writes to the exception return state register regardless, but in the case where the instruction is used with the fast exception code path, set an operand for that instruction so that it writes the same value that was previously stored in the exception return state register. Hence, on occasions when the modification instruction would not change the value in the exception return state register storage, by not signaling the fault on this occasion, this can improve performance by eliminating the added latency caused by signaling the fault (which would otherwise interrupt the current processing and cause another exception handler to be executed).

The GCS exception return state pop instruction could be implemented in different ways.

In some example, the GCS exception return state pop instruction could simply pop the GCS-protected exception return state information into register storage (either directly to the exception return state register storage, or to a general purpose register, from which a subsequent instruction could move the GCS-protected exception return state information to the exception return state register storage). The GCS-protected exception return state information could then be used directly for controlling an exception return, when a subsequent exception return instruction is executed. In this case, there is no need for software to manage saving/restoration of exception return state information to a software-managed stack structure in normal memory, as the execution of the GCS exception return state push/pop instructions mean that the GCS data structure is sufficient to track the exception return state even if nested exceptions cause the exception return state in the exception return state register storage to be overwritten.

In other examples, rather than being used to control exception return directly, the GCS-protected exception return state could be used to verify whether intended exception return state information stored in the exception return state register storage is safe to use for a subsequent exception return. In this case, the software may manage the exception return state information in the exception return state register storage using its normal mechanisms (e.g. with the software saving/restoring the exception return state to a stack data structure maintained in non-GCS memory, if exceptions are nested). The GCS exception return state push/pop instructions additionally save/restore exception return state to the GCS data structure to allow for the intended exception return state information obtained by software to be checked before it is used for controlling an exception return.

Hence, in such an example, in addition to causing the pop of the GCS-protected exception return state information from the GCS data structure, in response to the GCS exception return state pop instruction, the processing circuitry also signals a fault when a mismatch is detected between intended exception return state information obtained from the exception return state register storage and the GCS-protected exception return state information obtained from the GCS data structure. Hence, the GCS-protected exception return state information is used to verify the intended exception return state information, rather than being used to control the exception return directly.

In another example, while the GCS-protected exception return state information may be used to verify whether the intended exception return state information is correct, this verification may not happen in response to the GCS exception return state pop instruction itself, but instead a subsequent GCS exception return state verification instruction could verify whether the intended exception return state information in the exception return state register storage matches previously popped GCS-exception return state information obtained by the GCS exception return state pop instruction.

The exception return state information stored in the exception return state register storage can take various forms. In general, the exception return state register storage can comprise one or more registers storing the exception return state information. For example, the exception return state register storage may comprise an exception return address register to store an exception return address of an instruction to be executed after returning from an exception and/or a saved processor state register to store processor state to be restored on returning from an exception. The information stored in one or both of these registers may be stored to the GCS structure in response to the GCS exception return state push instruction.

The saved processor state register may be a register to which current processor state of the processing circuitry is copied from a processor state register to the saved processor state register in response to taking of an exception. Since it is possible that taking of the exception may cause the current processor state to change, the current processor state can be captured by copying it to the saved processor state register so that the processing circuitry is then free to update the current processor state according to the state in which the exception is to be taken. The exception handler executed in software may then read the saved processor state register and save the captured state to memory to ensure that the saved processor state is retained even if a further exception occurs pre-empting the handling of the previous exception. Using the GCS exception state push instruction, that saved processor state can also be pushed the GCS data structure to enable verification of the exception return state information at a corresponding exception return.

It can be useful that the exception return state lock parameter is a parameter specified in the processor state register. This means that the exception return state lock parameter will itself automatically be saved when an exception is taken because, along with other contents of the processor state register, it can be copied to the saved processor state register in response the taking of the exception. Similarly, in response to an exception return instruction, copying the saved processor state from the saved processor state register to the processor state register causes the previous value of the exception return state lock parameter to be restored. Hence, this approach means that if a new exception is taken during the window between exception entry and the GCS exception return state push instruction or in the window between the GCS exception return state pop instruction and an exception return, the current state of the exception return state lock parameter (which should be in the locked state during those windows) is captured and so can be restored on returning from the new exception as part of the normal restoration of saved processor state, to return to the previous state of the exception return state lock parameter at the time the new exception was taken. Hence, an attacker is not able to use triggering a new exception as a mechanism to try to circumvent the protection provided by the exception return state lock parameter.

It is not essential that the policing of modifications to the exception return state register storage based on the exception return state lock parameter is used in all operating states of the processing circuitry. For example, some control state information stored in one or more control registers could be used to determine whether the various checks of the exception return state lock parameter described above should be performed. Disabling these checks can be useful for backwards compatibility with software which has been written for legacy systems which did not support the exception return state lock parameter. Such legacy software may require greater vigilance by the software developer in ensuring that there are not loopholes available for an attacker to exploit to mount ROP attacks.

Hence, in one example, the at least one operating state of the processing circuitry comprises an operating state in which an exception-return-state-locking enable control parameter is set to an enable state indicating that locking of exception return state information using the exception return state lock parameter is enabled. If the exception-return-state-locking enable control parameter is set to a disable state, then there is no need to update or check the exception return state lock parameter as discussed above.

In some examples, the architectural mechanisms supporting the use of the GCS data structure (such as the GCS exception return state push/pop instructions, other instructions interacting with the GCS data structure, and various faults triggered to protect the GCS data structure against unauthorized access) could be disabled entirely depending on the state of a GCS-enable parameter. Again, this can provide support for software written for legacy systems which did not support these GCS-based architectural mechanisms. Hence, the at least one operating state of the processing circuitry (in which the various measures described above are taken in relation to the exception return state lock parameter) may comprise an operating state in which both: an exception-return-state-locking enable control parameter is set to an enable state indicating that locking of exception return state information using the exception return state lock parameter is enabled; and a GCS-enable parameter is set to an enable state indicating that a GCS mode for supporting use of the GCS data structure is enabled.

As discussed above, the memory management circuitry may reject a write request specifying a target address in response to determining that a memory region corresponding to the target address is specified as a GCS region and the write request is a request other than a GCS memory access request triggered by one of a restricted subset of GCS-accessing types of instruction permitted to access the GCS region. The memory management circuitry may also reject the memory access request in response to determining that the memory access request is the GCS memory access request and that the memory region corresponding to the target address is not the GCS region. This reduces the attack surface available to an attacker because it means that GCS memory access requests can only be used for accessing GCS regions and cannot be used for accessing regular memory regions used to store other data. This means that if the address operands of a GCS-accessing type of instruction are modified by the attacker (e.g. caused to be incorrect by the attacker forcing an incorrect sequence of program flow), so as to cause the GCS memory access requests to access a non-GCS region, this is detected as an error and the request to access memory will be rejected. This improves security by avoiding the attacker being able to fake the GCS-protected exception return state by substituting another region of memory for the GCS data structure.

While the GCS data structure is described above as being used for protecting exception return state information against ROP attacks, the same data structure could also be used for protecting function return state information, such as a function return address. A mechanism may be provided for detecting whether information obtained from the GCS data structure is exception return state information or function return state information (e.g. by distinguishing the encodings of a valid exception return state record and a valid function return state record so that they can be differentiated), so that the GCS exception return state verifying instruction may cause the processing circuitry to check whether the obtained GCS record used as the GCS protected exception return state information corresponds to a valid exception return state record, and so police against attempts to cause incorrect behaviour by using a function return state record to verify exception return state information for an exception return.

In other examples, the GCS data structure could be used for protecting exception return state information, but not for protecting function return state information (e.g. a different mechanism could be used to protect function return state against ROP attacks, or no protection against ROP attacks may be offered at an architectural level for function return state information (instead the responsibility for guarding against ROP attacks on function return may be with the software developer)). Hence, it is not essential for the GCS data structure to be shared between exception return state and function return state.

The techniques discussed above may be implemented within a data processing apparatus which has hardware circuitry provided for implementing the processing circuitry and memory management circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. The computer program may have processing program logic, register emulating program logic and memory management program logic which emulates functions of the processing circuitry, exception return state register storage and memory management circuitry discussed above, including support for the GCS exception return state push instruction and GCS exception return state pop instruction, and the exception return state lock parameter, as discussed above. Such a simulation program can be useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

Specific Example of Data Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU), which is an example of memory management circuitry, 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and access permissions which govern, for example, whether a given process executing on the pipeline is allowed to read, write or execute instructions from a given memory region.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness. While FIG. 1 shows a single processor core with access to memory 34, the apparatus 2 also could have one or more further processor cores sharing access to the memory 34 with each core having respective caches 8, 30, 32.

The apparatus also comprises exception handling circuitry 40 to control handling of exceptions. In response to an exception signal 42, the exception handling circuitry 40 interrupts the processing being performed by the pipeline 4, and controls the pipeline 4 to switch to processing of an exception handler corresponding to the type of exception indicated by the exception signal 42. For example, the exception could be an interrupt triggered by an external event that is not directly caused by the software being executed by the processing pipeline 4, e.g. an interrupt signaling an external event such as the user pressing a button on the electronic device comprising the processing apparatus, a processor reset being asserted, receipt of a message from a network interface or other input/output device, etc. Also, the exception could be a software-triggered exception directly caused by the instructions being executed by the pipeline 4. The software-triggered exception could be voluntarily triggered by the software, by executing an instruction to cause a "supervisor call" interrupt to be taken to trigger a switch to more privileged execution state, for example. Alternatively, the software-triggered exception could be an exception involuntarily triggered by the software, which occurs due to an error occurring with at least one instruction executed by the software, such as an undefined instruction error or an address fault.

Figures 2, 3:
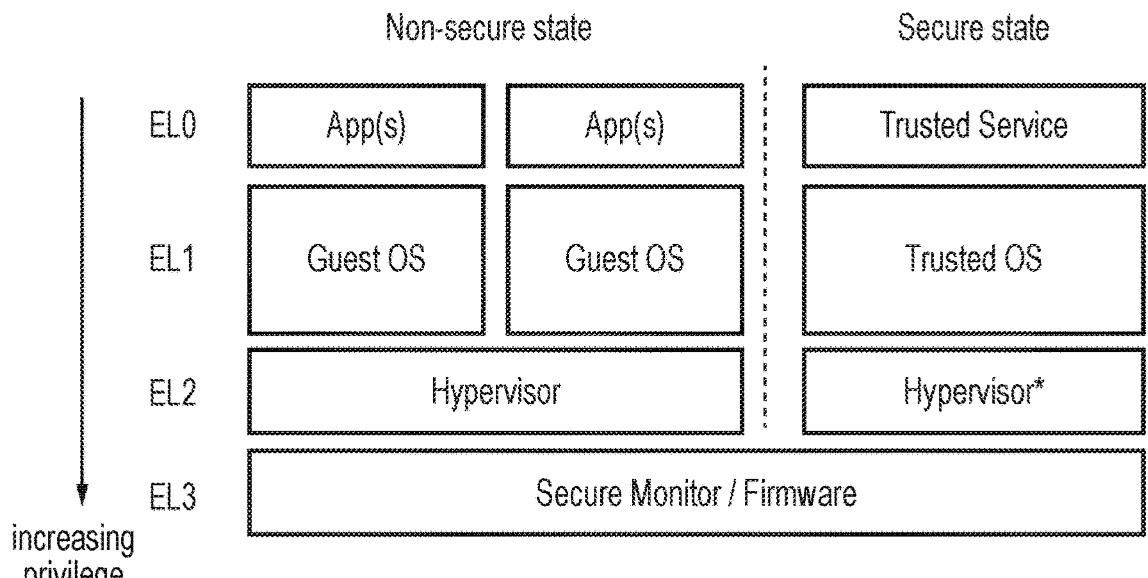
FIG. 2 illustrates an example of execution states of the processing circuitry.
FIG. 3 illustrates two-stage address translation.

FIG. 2 is a diagram illustrating different execution states (also referred to as exception levels) in which the processing circuitry 4 can operate when executing instructions. In this example there are four exception levels EL0, EL1, EL2, EL3, where exception level EL0 is the least privileged exception level and exception level EL3 is the most privileged exception level. In general, when executing in a more privileged exception level, the processing circuitry may have access to some memory locations or registers 14 which are inaccessible to lower, less privileged, exception levels.

In this example, exception level EL0 is for executing applications which are managed by corresponding operating systems or virtual machines executing at exception level EL1. Where multiple virtual machines coexist on the same physical platform then a hypervisor may be provided operating at EL2, to manage the respective virtual machines. Although FIG. 2 shows examples where the hypervisor manages the virtual machines and the virtual machines manage applications, it is also possible for a hypervisor to directly manage applications at EL0.

Although not essential, some implementations may implement separate hardware-partitioned secure and non-secure domains of operation for the processing circuitry. The data processing system 2 may have hardware features implemented within the processor and the memory system to ensure that data and code associated with software processes operating in the secure domain are isolated from access by processes operating in the non-secure domain. For example, a hardware architecture such as the TrustZone® architecture provided by Arm® Limited of Cambridge, UK may be used. Alternatively, other hardware enforced security partitioning architectures could be used. Secure applications (trusted services) may operate in exception level EL0 in the secure domain and secure (trusted) operating systems or virtual machines may operate in exception level EL1 in the secure domain. In some implementations, there is no support for EL2 in the secure state and the hypervisor may execute solely in non-secure EL2. In other implementations, there may be support for a secure hypervisor executing in secure EL2 as indicated by the asterisk in FIG. 2. In some examples, a secure monitor program for managing transitions between the non-secure domain and the secure domain may be provided executing in exception level EL3. Other implementations could police transitions between the security domains in hardware so that the secure monitor program may not be needed.

If an exception is taken while processing at a current exception level ELx, the exception may be taken either in the same exception level ELx or in a more privileged exception level ELy where y>x. A property associated with the exception type may indicate the target exception level for the exception.

Address Translation

One task performed by the MMU 28 is address translation between virtual addresses (VAs) and physical addresses (PAs). Software executing on the processing circuitry 4 specifies memory locations using virtual addresses, but these virtual addresses can be translated by the MMU 28 into physical addresses identifying the memory system location to access. A benefit of using virtual addresses is that it allows management software, such as an Operating System (OS), to control the view of memory that is presented to software. The OS can control what memory is visible, the virtual address at which that memory is visible, and what accesses are permitted to that memory. This allows the OS to sandbox applications (hiding the resources of one application from another application) and to provide abstraction from the underlying hardware. Another benefit of using virtual addresses is that an OS can present multiple fragmented physical regions of memory as a single, contiguous virtual address space to an application. Virtual addresses also benefit software developers, who will not know a system's exact memory addresses when writing their application. With virtual addresses, software developers do not need to concern themselves with the physical memory. The application knows that it is up to the OS and the hardware to work together to perform the address translation.

In practice, each application can use its own set of virtual addresses that will be mapped to different locations in the physical system. As the operating system switches between different applications it re-programs the map. This means that the virtual addresses for the current application will map to the correct physical location in memory.

Virtual addresses are translated to physical addresses through mappings. The mappings between virtual addresses and physical addresses are stored in translation tables (sometimes referred to as page tables). Translation tables are stored in memory and are managed by software, typically an OS or hypervisor. The translations tables are not static, and the tables can be updated as the needs of software change. This changes the mapping between virtual and physical addresses.

For memory accesses performed when the processing circuitry 4 is in a certain subset of execution states (in particular, when the processing circuitry 4 is in non-secure EL0 or non-secure EL1), two-stage address translation is used as shown in FIG. 3 (for other execution states one stage of address translation using the stage-1 page tables is sufficient). Hence, the virtual addresses from Non-secure EL0 and Non-secure EL1 are translated using two sets of tables. These tables support virtualization and allow the hypervisor to virtualize the view of physical memory that is seen by a given virtual machine (VM) (the virtual machine corresponding to a guest operating system and the applications controlled by that guest operating system). We call the set of translations that are controlled by the OS, Stage 1. The Stage 1 tables translate virtual addresses to intermediate physical addresses (IPAs). In Stage 1, the OS thinks that the IPAs are physical address spaces. However, the hypervisor controls a second set of translations, which is called Stage 2. This second set of translations translates IPAs to physical addresses.

The stage-1 and stage-2 translation tables are implemented as hierarchical table structures comprising a number of levels of translation tables for stage-1 and stage-2 respectively. Both the stage-1 and stage-2 tables can have up to 4 levels of page tables, namely level 0 (L0), level 1 (L1), level 2 (L2) and level 3 (L3).

To locate the physical address mapping for a given address, a translation table walk is performed comprising one or more translation table lookups. The translation table walk is the set of lookups that are required to translate the virtual address to the physical address. For the Non-secure EL1&0 translation regime, this set includes lookups for both the stage 1 translation and the stage 2 translation. The information returned by a successful translation table walk using stage-1 and stage-2 lookups is:

- The required physical address (translated based on the stage-1 mapping to the intermediate address and the stage-2 mapping to the physical address).
- Access permissions and/or memory attributes for the target memory region, which provide information about how to control access to that memory region. These may include stage-1 access permissions and/or attributes defined in the stage-1 table structure and stage-2 access permissions and/or attributes defined in the stage-2 table structure.

For traversing a given one of the stage-1 and stage-2 structures, the walk starts with a read of a top-level (L0) translation table for the initial lookup, based on an address specified in a translation table base address register (TTBR for stage 1, VTTBR_EL2 for stage 2). Each translation table lookup returns a descriptor, that indicates one of the following:

- The entry is the final entry of the traversal of the stage-1 or stage-2 structure, which provides the address mapping being sought. If the entry is in the final L3, this entry is called a Page descriptor (D_Page), while if the entry providing the final entry of the walk is at one of the higher levels it is called a Block descriptor (D_Block). The final entry of the traversal contains the output address (OA—i.e. IPA for stage 1 or PA for stage 2), and the permissions and attributes for the access. If a Block descriptor is found at a higher level of the translation table structure, this means that the Block descriptor represents a memory region of greater size than a 4 kB memory page represented by a single entry at L3 (the particular sizes represented by Block descriptors at L1 and L2 being dependent on the number of index bits used to index into the L1 or L2 tables—in this example L1 and L2 Block descriptors represent 1 GB and 2 MB regions respectively).

An additional level of lookup is required. In this case, the entry is called a Table descriptor (D_Table), since it provides the translation table base address for that lookup in a further level of table. The Table descriptor can optionally also provide other hierarchical attributes that can be applied to the final translation. An encoding of translation table entries at levels 1 and 2 distinguishes a Block descriptor from a Table descriptor.

The descriptor is invalid. In this case, the memory access generates a Translation fault.

Register State

Figure 4:
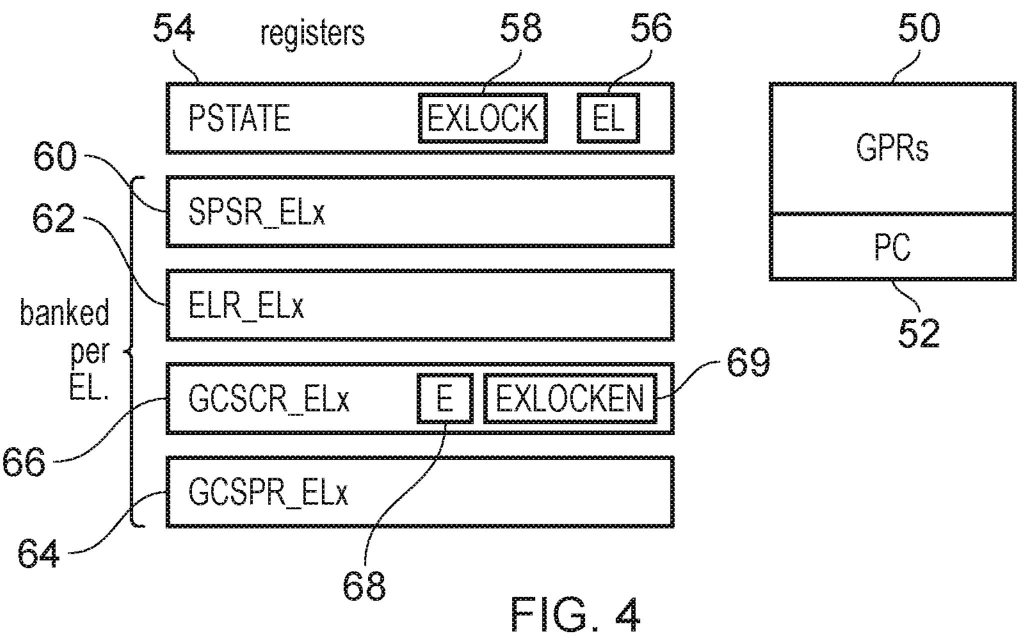
FIG. 4 illustrates an example of registers of the processing circuitry.

FIG. 4 shows an example of a subset of the registers 14 of the data processing apparatus, including registers for storing architectural state used for handling exception returns and for protecting the exception return state against tampering. The registers 14 include a set of general purpose registers (GPRs) 50 for storing general purpose operands and results of data processing instructions and load/store instructions. A program counter (PC) register 52 is provided to store a program counter value, which indicates an address of an instruction representing the current point of program flow. A processor state (PSTATE) register 54 stores one or more values indicative of a current state of the processing circuitry 4. For example, the PSTATE register 54 includes an indication 56 of the current exception level EL. The PSTATE register 54 can also include indications of a current instruction set to be used for decoding instructions at the decode stage 10, a current security state, other indications of a processor mode in which the processing circuitry 4 is operating, as well as condition code flags used to indicate outcomes of previous processing instructions which can be used to evaluate whether a test condition is satisfied for a subsequent conditional instruction (a conditional instruction controls the processing circuitry to execute a function conditional on the test condition being satisfied). Also, as discussed further below, the PSTATE register 54 includes an exception return state lock parameter (EXLOCK) 58 for locking exception return state information to prevent updates.

The registers 14 includes a number of exception return registers, including in this example a saved processor state register (SPSR) 60 and an exception link register (ELR) 62. In this example, the SPSR 60 and ELR 62 are banked registers, which means that a number of separate instances of these registers are provided corresponding to different exception levels EL1 to EL3. When an exception is taken to be handled in a given exception level ELx (where ELx is one of EL1, EL2 and EL3), the current program counter stored in the program counter register 52 is copied to ELR_ELx 62 and the current processor state stored in the PSTATE register 54 is copied to SPSR_ELx 60 (that is, copied to the versions of ELR 62 and SPSR 60 corresponding to the given exception level ELx). The copied value of the program counter can be referred to as an exception return address. The copied value of the current processor state can be referred to as saved processor state. The exception return address and saved processor state can collectively be referred to as exception return state information. On an exception return from an exception processed in the given exception level ELx, the saved processor state is copied from SPSR_ELx 60 to the PSTATE register 54 and the exception return address is copied from ELR_ELx 62 to the program counter register 52, to restore the processor to the state it was in when the exception was taken. The register suffixes ELx denote that the least privileged exception level in which instructions are allowed to write to these registers is exception ELx. Hence, SPSR_EL2, for example, would be writable when in EL2 or EL3 but not writable in EL0 or EL1.

The registers 14 also include a guarded control stack pointer register (GCSPR) 64, which is again banked per exception level so that there is a version GCSPR_ELx associated with each of the exception levels EL1, EL2, EL3. The GCS pointer register 64 is used to store a stack pointer which points to a data structure in memory called the guarded control stack (GCS) used for protecting the exception return state saved to the SPSR 60 and ELR 62 on an exception. This is discussed in more detail below. Also, the registers include a GCS control register (GCSCR) 66, which is also banked per exception level to provide versions GCSCR_ELx corresponding to exception levels EL1, EL2, EL3. When the processing circuitry 4 is operating in a given exception level ELx, the corresponding stack pointer and GCS control registers GCSPR_Elx and GCSCR_ELx provide the stack pointer and control state for controlling use of the GCS data structure. The GCS control register 66 includes at least a GCS enable parameter 68 for controlling whether architectural measures for protecting use of the GCS data structure are enabled or disabled, and an exception-return-state locking enable parameter (EXLOCKEN) 69 for controlling whether use of the exception return state lock parameter (EXLOCK) 58 to prevent modification of the exception return registers 60, 62 is enabled or disabled. It will be appreciated that the GCS control register 66 could also store other state information for controlling the behaviour of the processing circuitry when in the GCS mode in which use of the GCS data structure is enabled as indicated by the enable parameter 68.

While FIG. 4 shows an example where the registers 60, 62, 64, 66 are banked to provide multiple versions of these registers corresponding to different exception states of the processing circuitry 4, this is not essential, and in other examples a single version of any of these registers could be provided, shared between exception states. In that case, software could switch the value stored in the shared register when switching between exception states so that the value stored in the shared register in a given exception state can be different to the value stored in the shared register in a different exception state. It is also possible for a subset of the registers 60, 62, 64, 66 to be banked while another subset of the registers 60, 62, 64, 66 are shared between exception states.

Figure 5:
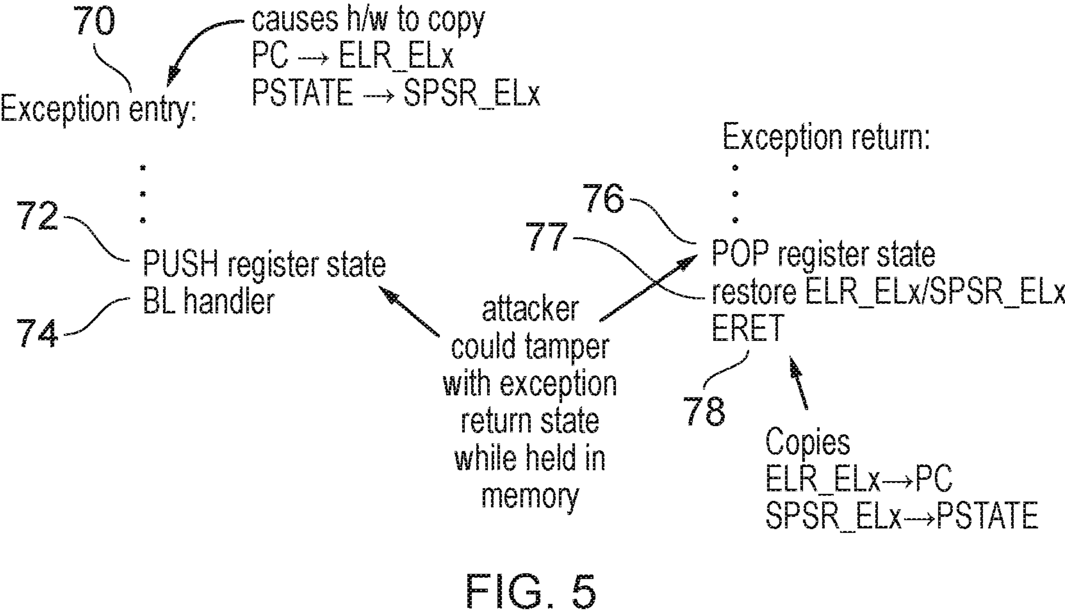
FIG. 5 illustrates an example of instructions executed on entry to a taken exception and return from the exception.

FIG. 5 illustrates an example of instructions executed on exception entry and return, in a system which does not support use of the GCS. The left-hand side of FIG. 5 illustrates an exception entry sequence. In response to the taking of an exception by the exception handling circuitry 40, the exception handling circuitry 40 triggers the processing circuitry 4 to copy the current program counter value and current processor state from the program counter register 52 and PSTATE register 54 respectively to the exception link register 62 and SPSR 60 associated with the exception state ELx in which the exception is to be taken. This copying of the exception return state for the exception is triggered in hardware, so does not require any particular instruction to be executed to cause the copying of exception return state. The exception handling circuitry 40 then controls the processing circuitry to execute an exception handling routine. For example, the exception handling routine initially executed in response to exception entry could be a generic exception wrapper handler which perform some generic control functions before branching to a more specific handler for dealing with the specific cause of the exception. Hence, before branching to the specific handler, to ensure that the saved exception return state is preserved even if a further exception occurs causing new exception return state to be copied to register 60, 62, the exception handling routine executes an instruction 72 to push register state information (including at least the exception return state information from the SPSR 60 and ELR 62) to a software-maintained data structure in memory, such as a stack. The particular way in which the data structure used to preserve the exception return state is organised can be chosen in a software-specific manner and there may be no architectural definition of how this exception return state is to be preserved. Having saved the exception return state to memory, the exception handling software code executes a function calling branch instruction 74 which branches to the specific handler code for dealing with the cause of the exception.

On returning from the exception, the exception handling software code executes an instruction 76 to read the previously saved register state from the data structure in memory (e.g. pop the register state from a stack data structure), an instruction 77 to restore the register state to the exception return registers 60, 62 (e.g. this could be a system register modifying instruction allowed to write to system control registers), and an exception return instruction 78 to trigger an exception return based on the exception return state stored in registers 60, 62. Hence, the exception return instruction 78 causes the previously saved processor state to be copied from SPSR_ELx 60 to the PSTATE register 54 and the previously saved exception return address to be copied from ELR_ELx 62 to the program counter register 52. This causes a branch to the instruction indicated by the previously saved exception return address, which will be executed with the processor state as indicated in the previously saved processor state value in SPSR_ELx.

An attacker may try to mount a return oriented programming (ROP) attack by tampering with the exception return state information while it is held in memory between being written by instruction 72 and read by instruction 76. If the attacker can succeed in corrupting the exception return state, this could allow the exception return to return to a different point of the program from the one at which the exception was taken, or to return the processor state represented by PSTATE register 54 to a different state from when the exception was taken (e.g. a state with greater privilege), both of which could result in undesired behaviour which could potentially risk compromising secure information or software code.

Figure 6:
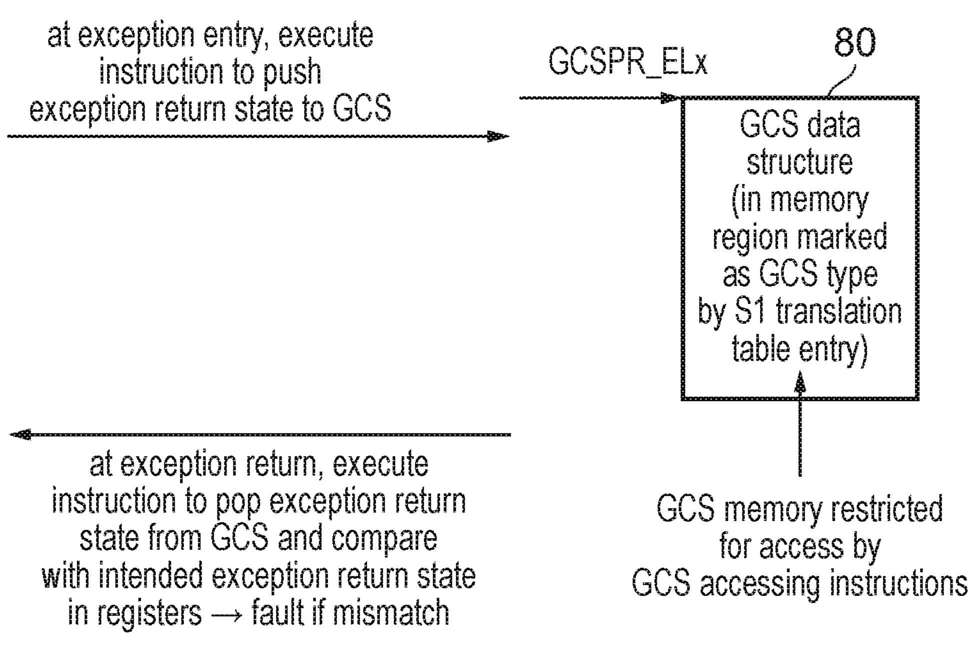
FIG. 6 illustrates use of a guarded control stack (GCS) structure to protect return state information captured in response to exception entry.

FIG. 6 illustrates a technique for protecting against such ROP attacks on exception return state. On exception entry, an additional instruction is executed to push the exception return state captured for the exception in registers 60, 62 to a protected data structure called the guarded control stack (GCS) data structure 80. The address to which the exception return state is pushed is determined based on the GCS stack pointer register 64 associated with the current exception state ELx. The access permissions specified by the page tables (used by the MMU 28 to control address translation) define the address region used to store the GCS data structure 80 as a special "GCS" memory type which is restricted to be accessed only by a restricted subset of GCS accessing instructions, and cannot be accessed using other types of instruction is not in that restricted subset. Hence, an attacker who tampers with the address operands for a general purpose load/store instruction of the program being executed may not be able to cause instruction to access the GCS data structure 80 when that instruction is not one of the special GCS accessing instructions. For example, the GCS memory type may be indicated within stage-1 access permissions specified directly or indirectly by a corresponding stage-1 translation table entry used to provide the mapping between the virtual address space and the intermediate address space (e.g. the GCS memory type permission could be indicated in the encoding of the stage-1 translation table entry itself, or in a register which is referenced by the stage-1 translation table entry). Conversely, if a GCS accessing instruction attempts to access a region of memory not designated as the GCS memory type then a fault may be signaled to prevent an attacker fooling a GCS access instruction into accessing a region other than the GCS data structure 80.

On exception return, separate from any software-controlled restoration of exception return state (intended to subsequently be used by an exception return state instruction 78 to control exception return) from a software-specific data structure in memory as discussed FIG. 5, an additional GCS pop instruction is executed to pop protected exception return state from a location on the GCS data structure 80 determined based on the GCS stack pointer in GCSPR_ELx 64, compare the protected exception return state against the intended exception return state, and signal a fault if a mismatch is detected. This provides a means of detecting if the intended return state has been tampered with in memory before it was popped by instruction 76. If the intended exception return state matches the protected exception return state obtained from the GCS data structure 80, then the exception return instruction 78 can proceed to trigger the exception return based on the intended exception return state.

Figure 7:
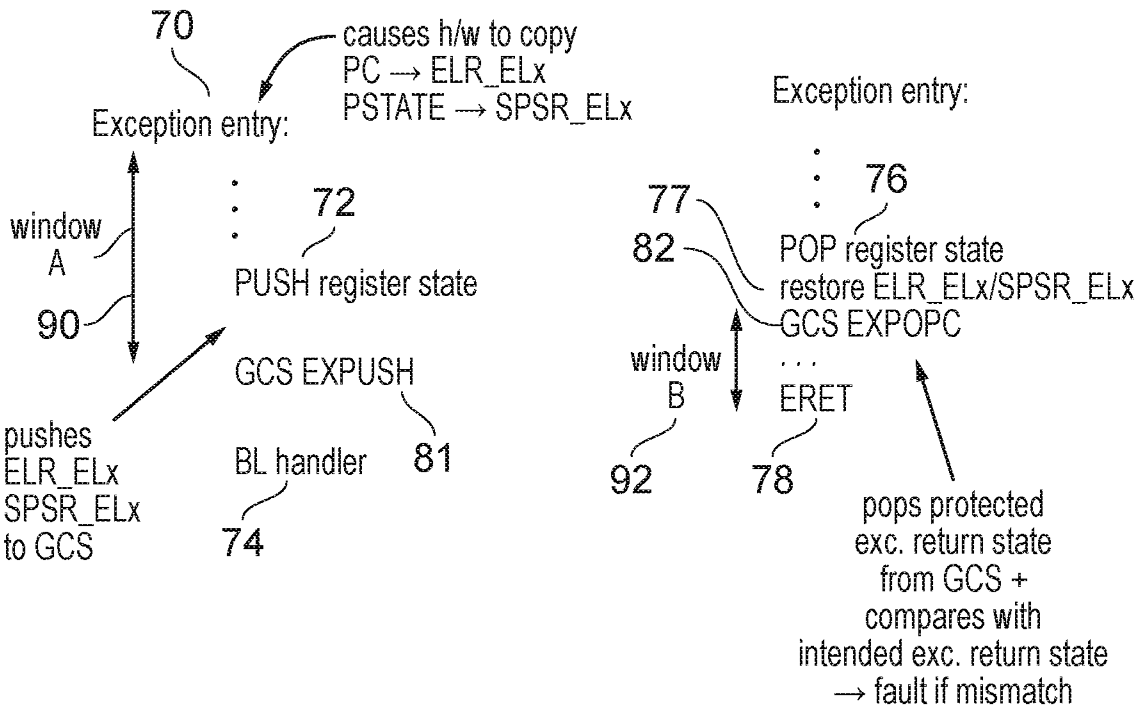
FIG. 7 illustrates an example of instructions executed on entry to a taken exception and return from the exception, when using the GCS structure.

Hence, as shown in FIG. 7, the exception entry and return code is expanded to include an additional GCS exception state push instruction 81 on exception entry and a GCS exception state verifying (pop and compare) instruction 82 on exception return, to provide added protection for the exception return state push to memory by instruction 72 and read back by instruction 76. While FIG. 7 shows a single instruction 82 which both pops the protected exception return state from the GCS data structure 80 and verifies the intended exception return state in registers 60, 62 against the protected exception return state, other examples could separate this into two separate instructions, one for popping the protected exception return state from memory and another for verifying whether the intended exception return state matches the popped exception return state. Also, in some examples, the GCS exception return state pop instruction 82 may only pop exception return state from the GCS data structure 80, but not verify it against the exception return state in the exception return state registers 60, 62 (e.g. the GCS exception return state pop instruction 82 could pop the GCS-protected exception return state directly to the exception return state registers 60, 62, from which the GCS-protected exception return state could be used by the exception return instruction 78 to control the exception return directly—in this case there would be no need for the software to execute instructions 72, 76 to push/pop the exception return state to a separate software-managed stack in normal non-GCS memory).

The instructions 81, 82 provided for pushing exception return state to the GCS structure 80 and popping exception return state from the GCS structure are considered GCS accessing instructions allowed to access a memory region specified in the stage-1 access permissions as being a GCS region of memory.

It will be appreciated that the various GCS-related functions discussed above may be performed when the GCS enable parameter 68 is set to an enable state indicating that a GCS mode is enabled. When the GCS enable parameter 68 is set to a disable state to indicate that GCS mode is disabled (e.g. this could be useful for compatibility with legacy code not designed for use with the GCS mode), then the GCS accessing instructions may be treated as no-operation instructions which have no architectural function or could be treated as undefined instructions (causing a fault to be signaled if the GCS accessing instructions are executed), and additional checks which may be performed for certain non-GCS accessing instructions when GCS mode is enabled may be omitted (see the example flow diagrams discussed below).

The GCS mode can be useful to support a protected region in memory being used to maintain a copy of the valid exception return state captured for a given exception which can either be used to control an exception return directly, or be used to verify the "intended" exception return state that will be used to control the exception return.

However, as the GCS exception state push instruction 80 is separate from the hardware-triggered capture of the exception return state in response to exception entry 70, there is a window of time 90 (labelled in FIG. 7 as "Window A") when an attacker may attempt to modify the contents of the exception return state registers 60, 62 so that the exception return state that gets pushed to the GCS data structure 80 in response to instruction 81 is not the same as the exception return state that was captured in response to taking of the exception. Similarly, at the exception return, there is a window of time 92 (labelled as "Window B") between executing the GCS exception return state pop instruction 82 and executing the exception return instruction 78 when the exception return state information could be modified in registers 60, 62, which could allow an exception return to be triggered to a program counter value and processor state which has not been either obtained from the GCS 80 or verified against state obtained from the GCS 80.

To address this issue, an exception return state locking parameter (EXLOCK) 58 is provided in the PSTATE register 54. EXLOCK 58 can be set to a locked state and an unlocked state. In one example, EXLOCK=1 in the locked state and EXLOCK=0 in the unlocked state. Other examples could use the opposite mapping, or EXLOCK 58 could be a multi-bit parameter which encodes both the exception return state locking parameter and other information, in which a first subset of states of EXLOCK 58 could be regarded as the locked state and a second subset of states of EXLOCK 58 could be regarded as the unlocked state. Therefore, there are a variety of ways in which EXLOCK 58 could be encoded to indicate the locked and unlocked states.

When EXLOCK is in the unlocked state then modifications to the exception return state registers may be permitted (providing any other checks are satisfied, such as the current exception level 56 being of a sufficient privilege to update the particular banked version of the exception return state registers 60, 62 that is attempted to be modified). When EXLOCK 58 is in the locked state then modifications to information stored in the exception return state in registers 60, 62 are prohibited, even if attempted using an instruction which otherwise would be allowed to modify the exception return state information if executed when EXLOCK 58 is in the unlocked state. At least for exceptions taken in the same exception level that was current before the exception was taken, the EXLOCK parameter 58 can be set to lock the exception return state registers 60, 62 against modification during window A 90 and window B 92 as shown in FIG. 7, to prevent tampering with the exception return state information between being captured on exception entry and pushed to the GCS data structure 80, and between verification against protected exception return state restored from the GCS data structure 80 and use for an exception return 78. It may be considered that exceptions taken in a more privileged exception level than the current exception level do not require the lock parameter to be set on taking the exception, as the more privileged code executing after the exception is taken can be trusted to manage its return state appropriately.

Hence, an architectural mechanism is provided to prevent modification of the exception return state before it is saved to the GCS data structure 80 and after it is restored from the GCS data structure 80. On taking an exception, the state is locked and is unmodifiable. PSTATE.EXLOCK 58 can lock write access to the ELR 62 and SPSR 60 (at least for writes that attempt to change the value stored in register 60 or 62), and is set on taking the exception. On executing a push procedure 81 to save the exception return state to the GCS buffer 80, PSTATE.EXLOCK is unlocked, allowing future writes to the registers 60, 62. On executing a pop procedure 82 to restore the exception return state from the GCS buffer 80, PSTATE.EXLOCK is re-locked, preventing future writes and ensuring the state restored from the GCS is immutable. When locked, attempted writes to the state (the ELR/SPSR) cause a fault to be signaled (which may cause a further exception to be taken). Alternatively, this fault could occur only if the value being written to one or both of the registers 60, 62 is different from the current value in that register. This allows a fast code path for scenarios where the return state is unchanged.

Additional checks of the EXLOCK parameter 85 may be performed, so that a fault may be triggered if any of the following occurs:

- an exception entry 70 when the EXLOCK parameter 85 is currently in the locked state;
- a GCS exception state push procedure 81 when the EXLOCK parameter 85 is currently in the unlocked state;
- a GCS exception state pop procedure 82 when the EXLOCK parameter 85 is currently in the locked state; and
- an exception return 78 when the EXLOCK parameter 85 is currently in the unlocked state.

Any of these events may be an indication that an attacker has corrupted control flow so as to miss out one of the GCS protecting instructions or cause the code to be executed in a different order to intended, which could be a signal that an ROP attack is attempted.

An exception-return-state-locking enable control parameter, EXLOCKEN 69, can be set to an enable state or a disable state (which again could be encoded in a variety of ways similar to those discussed above for EXLOCK 58), with the enable state indicating that the exception return state locking features discussed above using the exception return state locking parameter 58 are enabled, and the disable state indicating that these exception return state locking features are disabled. As shown below, various checks based on the EXLOCK parameter 58 (and actions to set the EXLOCK parameter 58 to the locked or unlocked state) can be disabled if either GCS mode is disabled using the GCS enable parameter 68 set to the disable state, or EXLOCKEN 69 is set to the disable state.

Figure 8:
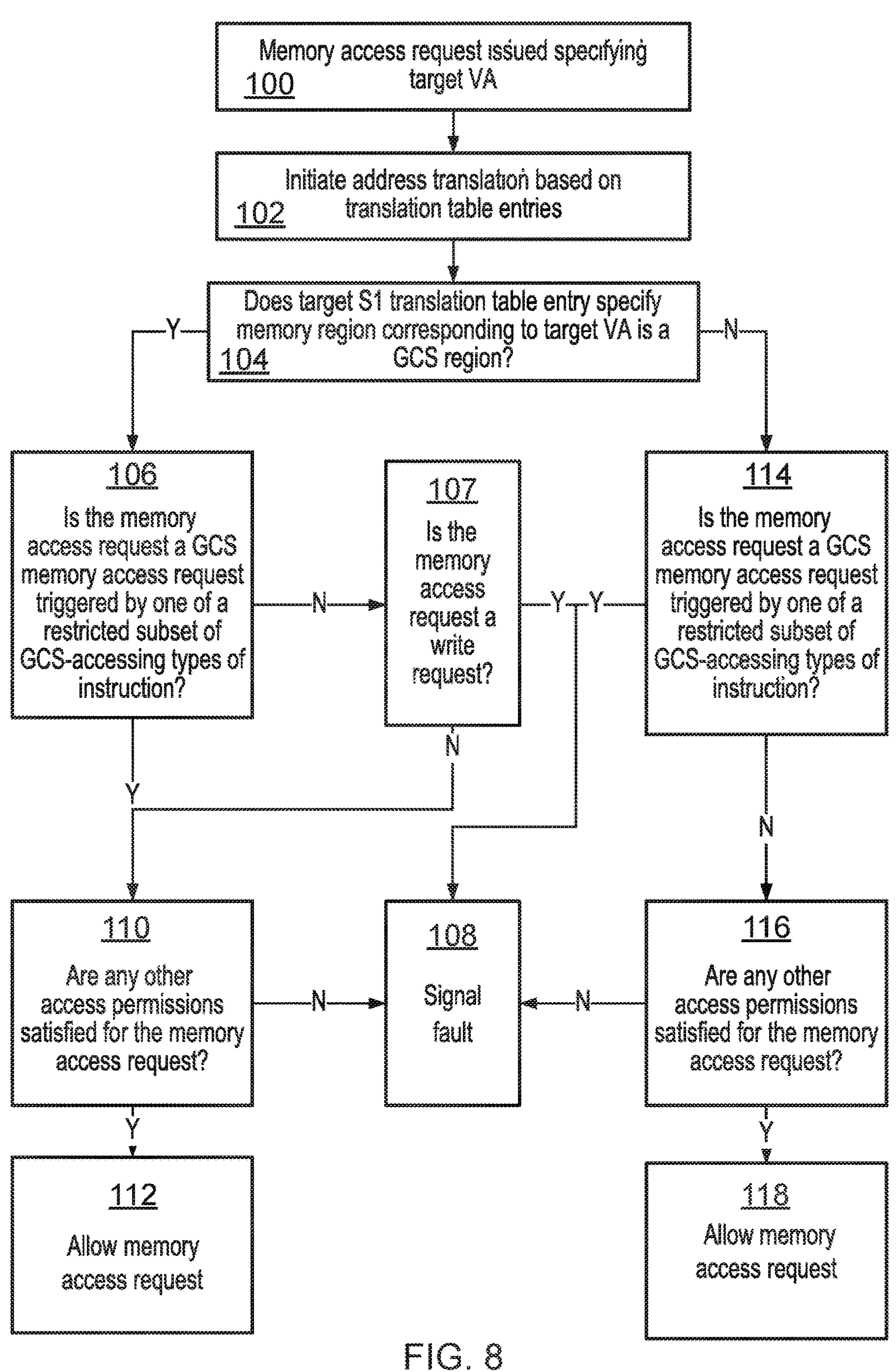
FIG. 8 is a flow diagram illustrating a method of checking whether a memory access request is allowed.

FIG. 8 is a flow diagram showing access permission checking performed by the MMU 28 for memory accesses issued when the GCS mode is enabled by the GCS enable parameter 68 stored in the GCS control register 66 for the current exception level ELx. At step 100 a memory access request is issued specifying a target virtual address corresponding to a target memory region. At step 102 the MMU 28 initiates address translation based on the relevant stage-1 (and if necessary, stage-2) address mappings defined in the stage-1 and stage-2 address translation structures as shown in FIG. 3. Any known address translation technique may be used for defining the address mappings for the translation. At step 104, the MMU 28 determines whether the stage-1 permission information, specified either directly or indirectly by the target stage-1 translation table entry which provides the address mapping for the target virtual address, specifies that the target memory region is a GCS region. For example, the stage-1 permission information could be encoded in the target stage-1 translation table entry itself, or stored in a register field referenced by the target stage-1 translation table entry. Other examples could define GCS regions using stage-2 permission information specified (directly, or indirectly via a reference to a register) by the stage-2 translation table entry corresponding to the intermediate address mapped to the target VA by the target stage-1 translation table entry. Also, it would be possible for a separate data structure (separate from the translation table structures) to define which memory regions are GCS regions.

If the target memory region is a GCS region, then at step 106, the MMU 28 determines whether the memory access request is a GCS memory access request triggered by one of the restricted subset of GCS accessing types of instruction allowed to access the GCS region. If not, then at step 107 the MMU 28 determines whether the memory access request is a write request. If the memory access request is a write request, then at step 108 a fault is signaled, to prevent other general load/store instruction types being able to access the GCS structure 80. If the memory access request is a read request, there is no need to signal the fault, and the method proceeds to step 110 (other examples could choose also to signal a fault for non-GCS read requests to a GCS memory region, but this is optional as the read requests will not corrupt the GCS-protected exception return state information).

If the memory access request is a GCS memory access request, then at step 110 the MMU 28 determines whether any other access permissions are satisfied for the memory access request. For example, this may be based on other parameters specified in the stage-1 or stage-2 translation table entries corresponding to the target region, or other security checks, e.g. based on the security state, exception level or other operating modes of the processing circuitry 4. If any other required access permission is not satisfied then a fault is again signaled at step 108. If any other access permissions required to be satisfied for the memory access request are determined all to be satisfied then at step 112 the memory access request can be allowed.

If at step 104, the MMU 28 determines that the target memory region was not a GCS region, then at step 114 the MMU 28 determines whether the memory access request is a GCS memory access request triggered by one of the restricted subset of GCS-accessing types of instruction. This is the same check as at step 106, but with the opposite outcome compared to step 106. At step 114, if the memory access request is a GCS memory access request, then a fault is signaled at step 108. This ensures that GCS memory access requests cannot be used to access non-GCS regions of memory, which will avoid software developers being tempted to use the GCS-accessing types of instruction for non-GCS accesses which would increase the attack surface available for an attacker, and allows for detection of the address operands of a GCS-accessing type of instruction being modified by an attacker to point to a region other than the GCS. By restricting GCS-accessing types of instruction to accessing GCS regions and non-GCS-accessing types of instruction to accessing non-GCS regions, security can be improved.

If at step 114 the memory access request is determined not to be a GCS memory access request, then at step 116 the MMU 28 determines whether any other access permissions are satisfied for the memory access request. For example, this could include the checks based on security state, exception level or operating mode as discussed above. If all required access conditions are satisfied, at step 118 the memory access request is allowed. If any access permission is breached, then a fault is signaled at step 108.

While FIG. 8 shows a single step 108 signaling a fault in response to a number of different checks being failed, it will be appreciated that some implementations may signal different fault types depending on the cause of the fault.

FIG. 8 shows checks performed if the memory access request is received while GCS mode is enabled by the GCS mode enable parameter 68 in the GCS control register 66 for the current exception level ELx. If GCS mode is currently disabled then steps 104, 106, 107, 114 can be omitted and the checks performed may be checks based on other access permissions not related to use of the GCS data structure 80 as described at steps 110, 116.

As shown in FIG. 8, protection for the GCS data structure 80 is provided at an architectural level by the MMU 28 supporting definition (e.g. using the translation tables) of a dedicated GCS memory region type which indicates that addresses in that region are subject to extra protection, in being required to be accessed by the limited subset of GCS-accessing types of instructions and not by other load/store instructions. The GCS-accessing types of instructions may include at least the GCS exception return state push instruction 81 and GCS exception return state pop/verify instruction 82 discussed above in FIG. 7. Other types of GCS-accessing types of instructions could also be provided, such as a stand-alone GCS exception return state pop instruction which pops exception return state from the GCS data structure 80 without also verifying it against intended exception return state. Other GCS-accessing types of instructions could be provided for pushing and restoring function return state so as to protect the return address used for a function return, for example.

Figure 9:
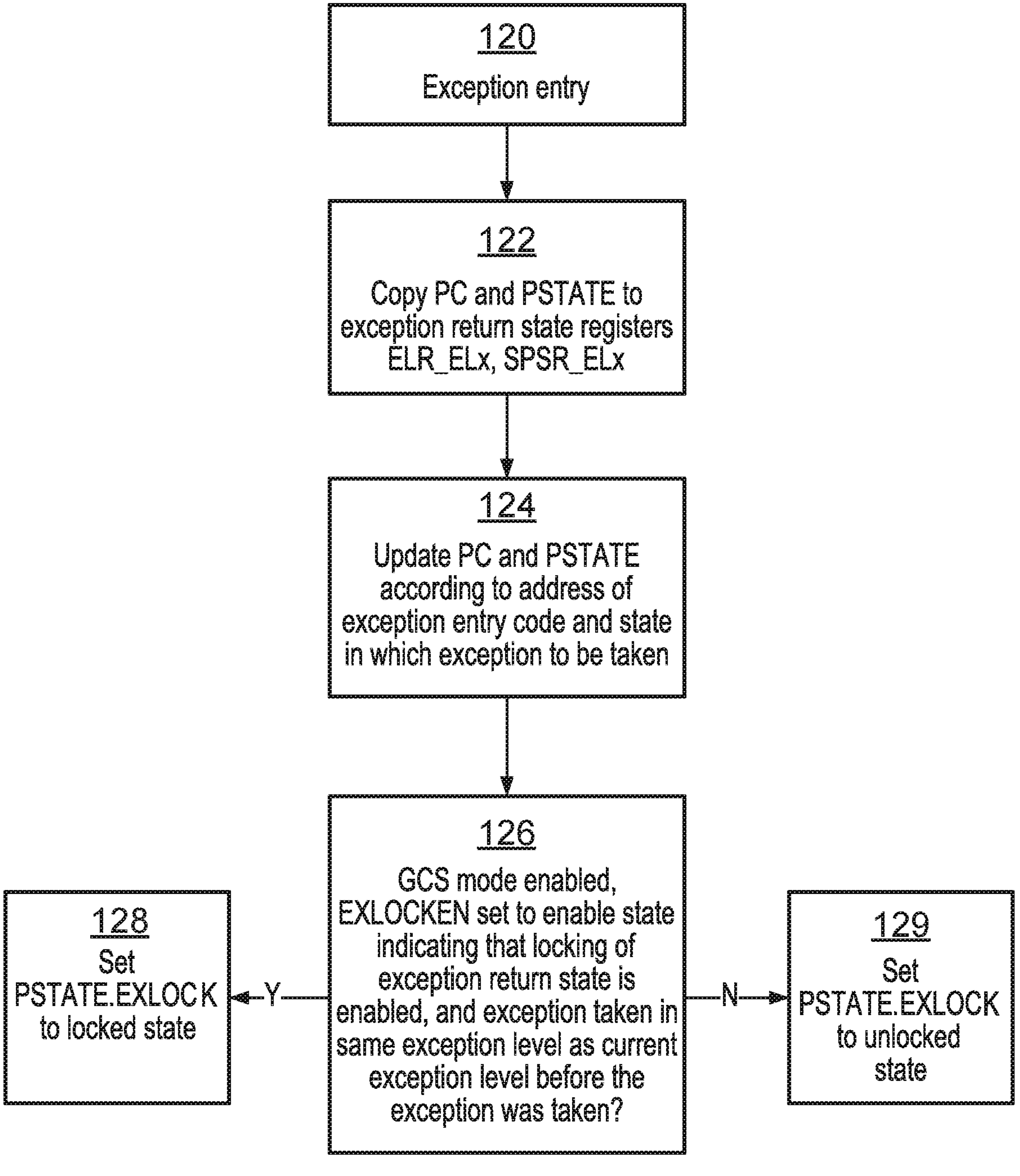
FIG. 9 is a flow diagram illustrating steps performed on exception entry.

FIG. 9 is a flow diagram illustrating steps performed in response to exception entry. At step 120, the exception handling circuitry 40 detects, based on the exception signal 42, that an exception is to be taken and triggers the exception entry procedure. In response to the exception entry, at step 122 the program counter and current processor state are copied from registers 52, 54 to the versions of the exception link register 62 and saved processor state register 60 respectively corresponding to the exception level ELx in which the exception is to be taken. At step 124, the processing circuitry 4 or the exception handling circuitry 40 updates the program counter register 52 to indicate an address of a first instruction to be executed from exception entry program code, and updates the PSTATE register 54 to indicate the processor state in which the exception is to be taken, to cause a branch to the exception entry code which will then be executed in the new state indicated by the PSTATE register 54. At step 126, the processing circuitry 4 determines (based on the GCS enable parameter 68) whether the GCS mode is currently enabled and determines (based on the GCS exception-return-state locking enable parameter EXLOCKEN 69) whether locking of exception return status enabled (the versions of parameters 68, 69 to use are the versions stored in the one of banked versions of GCS control register 66 that corresponds to the current exception level ELx). Also, the processing circuitry 4 determines whether the exception is to be taken in the same exception level (ELx) as the current exception level before the exception was taken. When the GCS mode is enabled and locking of exception return state is enabled, and the exception is to be taken in the same exception level as the current exception level before the exception is taken, then at step 128 the processing circuitry 4 sets the exception return state lock parameter EXLOCK 58 to the locked state. Otherwise, EXLOCK 58 is set to the unlocked state at step 129. While FIG. 9 shows an example where EXLOCK 58 is set to the locked state only for exceptions taken in the same exception level EL, other examples could also set EXLOCK 58 to the locked state for exceptions taken to a more privileged exception level.

Figure 10:
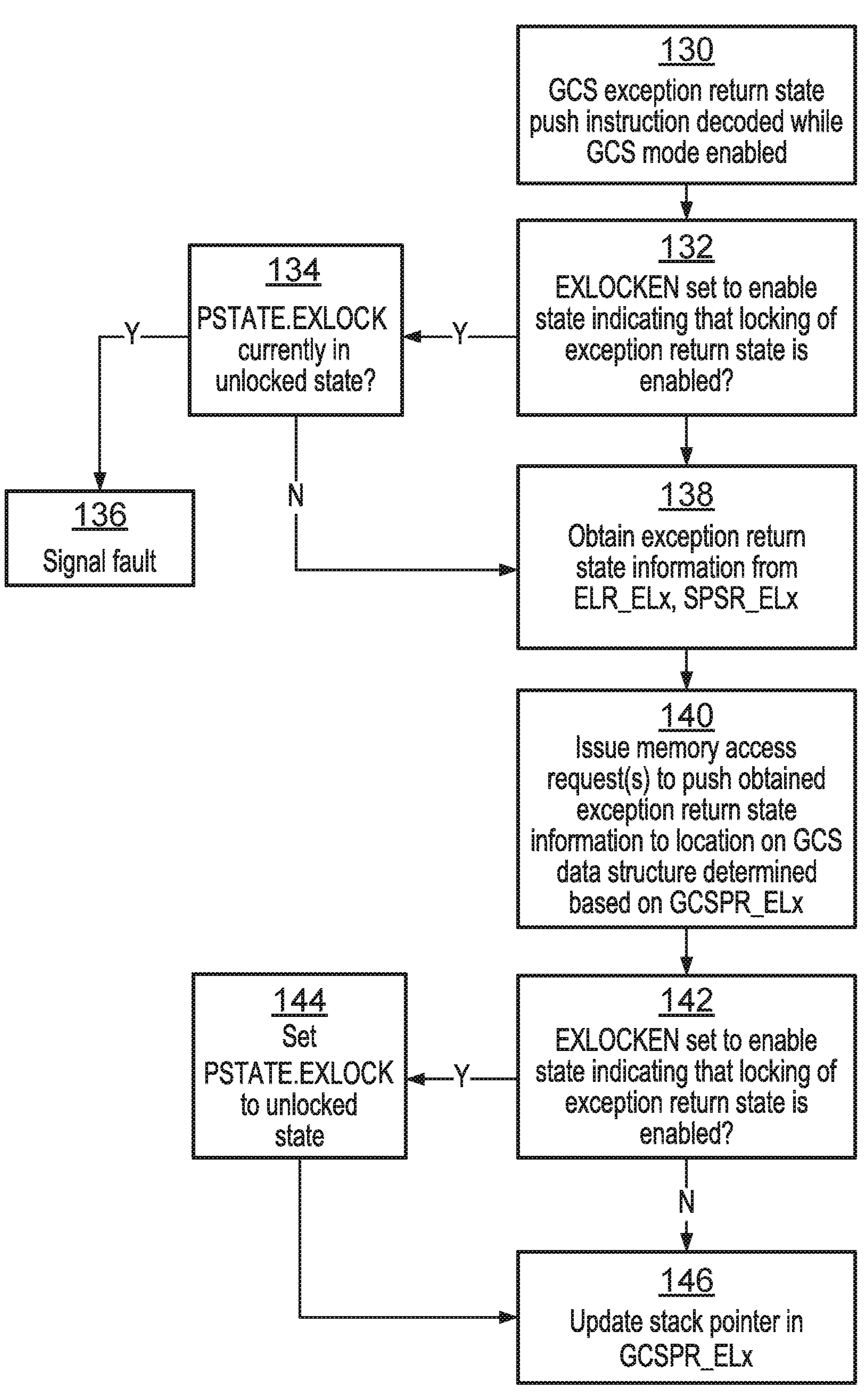
FIG. 10 is a flow diagram showing steps performed in response to a GCS exception return state push instruction.

FIG. 10 is a flow diagram showing an exception return state push procedure to push protected exception return state to the GCS data structure 80. At step 130, the instruction decoder 10 decodes a GCS exception return state push instruction while the GCS enable parameter 68 is in the enable state indicating that GCS mode is enabled (if GCS mode had been disabled then the GCS exception return state push instruction could be interpreted as a no-operation instruction or an undefined instruction, and the remaining steps of FIG. 10 are not performed). At step 132, the processing circuitry 4 is controlled by the instruction decoder 10 to check whether EXLOCKEN 69 indicates that locking of exception return state is enabled (the version of parameter 69 to use for the check at step 132 is the version corresponding to the current exception level, if banked versions of the GCS control register 66 are provided for different exception levels). If so, then at step 134, the processing circuitry 4 is controlled to check whether the exception return state lock parameter (EXLOCK 58) is currently in the unlocked state. If EXLOCK 58 is in the unlocked state then at step 136 a fault is signaled, because for a valid exception entry sequence when exception return state locking is enabled, as shown in FIG. 7 the exception return state lock parameter 58 should currently be locked when exception return state is being pushed to the GCS data structure 80 (for exceptions taken to a more privileged exception level for which EXLOCK 58 is not locked on taking the exception as described in FIG. 9, there is no need to execute the GCS exception return state push instruction at all as the more privileged exception handler can be trusted to manage the exception return state, so the requirement for EXLOCK 58 to be locked when executing the GCS exception return state push instruction does not cause a problem for those more privileged exception handlers). Signaling a fault if EXLOCK 58 is currently in the unlocked state provides a counter-measure against attacks based on tampering with program flow to cause the GCS push procedure to be executed other than following an exception entry. Hence, the check at step 134 reduces the risk of arbitrary exception return state controlled by the attacker (which is not the exception return state captured in response to an exception entry) being pushed the GCS data structure 80.

If either exception return state locking is found to be disabled at step 132 (EXLOCKEN 69 was set to the disable state) or EXLOCK 58 is in the locked state at step 134, then at step 138 the processing circuitry 4 obtains exception return state information from the exception return state registers 60, 62 and at step 140 the processing circuitry 4 issues one or more memory access requests to push the obtained exception return state information to a location on the GCS data structure 80 that was determined based on the current stack pointer stored in the GCS pointer register GCSPR_ELx 64 that corresponds to the current exception level ELx.

At step 140 the processing circuitry 4 checks whether EXLOCKEN 69 indicates that locking of exception return state is enabled, and proceeds to step 144 if locking of exception return state is enabled (or alternatively, the same check performed at step 132 may also cause step 144 to be conditionally performed depending on whether locking of exception return state is enabled or disabled, so it may not be needed to check the EXLOCKEN parameter 69 again). If locking of exception return state is enabled, then at step 144, the exception return state lock parameter 58 is set to the unlocked state (this step is skipped if locking of exception return state is disabled). Regardless of whether locking of exception return state is enabled or disabled, at step 146, the processing circuitry 4 updates the stack pointer in the GCS pointer registers 64 corresponding to the current execution state (exception level) ELx to account for the push of the exception return state to the stack (e.g. the stack pointer can be decremented or incremented by an amount corresponding to the size of the exception return state record formed based on the contents of registers 60, 62).

Figure 11:
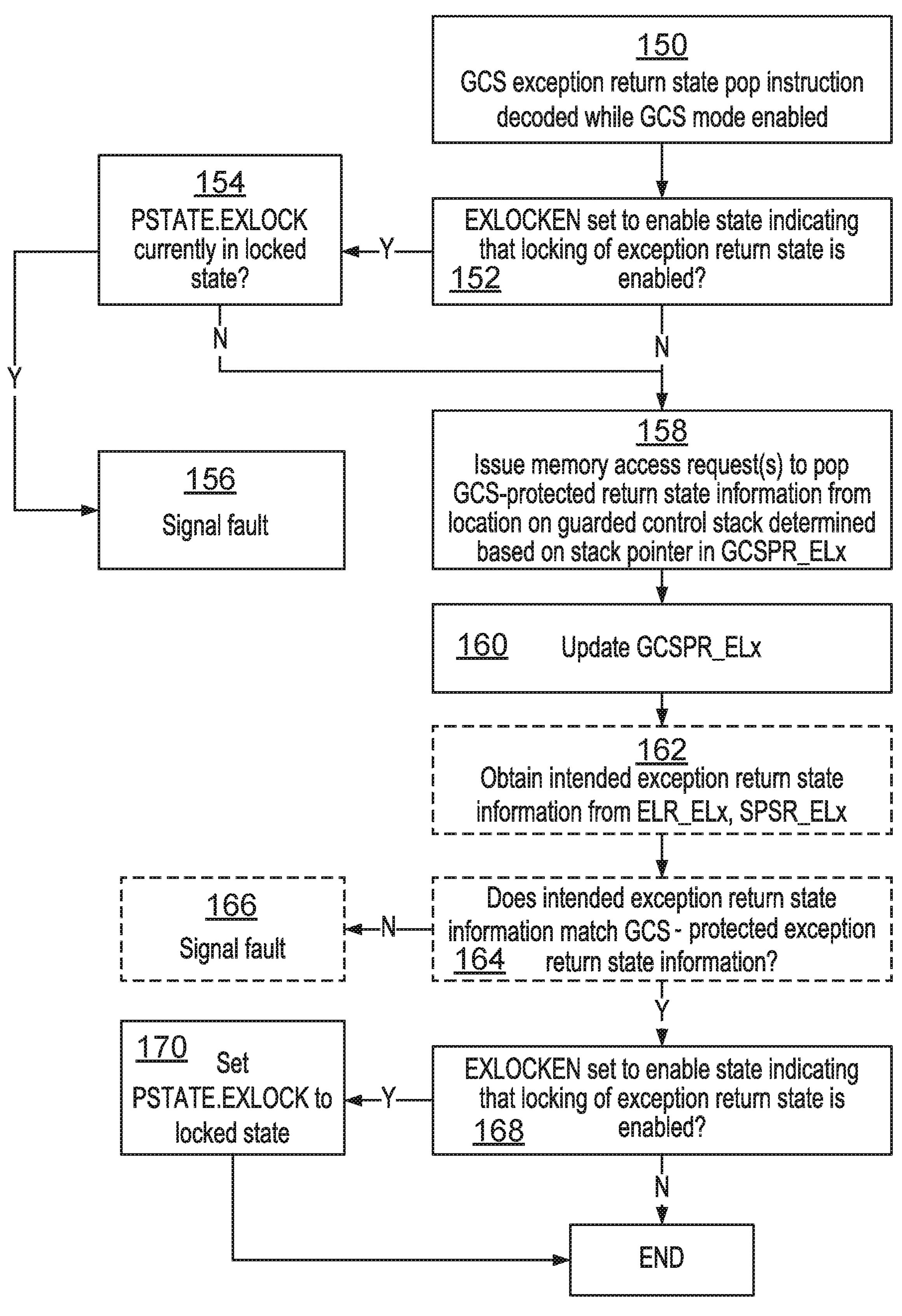
FIG. 11 is a flow diagram showing steps performed in response to a GCS exception return state pop instruction.

FIG. 11 is a flow diagram showing steps performed for popping exception return state from the GCS data structure 80. At step 150 the instruction decoder 10 decodes a GCS exception return state pop instruction while GCS mode as indicated as enabled by the GCS enable parameter 68 (again, if the GCS mode is disabled, the GCS exception return state pop instruction may be treated as a NOP (no-operation instruction) or undefined instruction, and the remaining steps of FIG. 11 may not be performed).

In response to the GCS exception return state pop instruction, at step 152 the processing circuitry 4 checks whether EXLOCKEN 69 is set to the enable state indicating that the locking of exception return state is enabled (the version of parameter 69 to use for the check at step 152 is the version corresponding to the current exception level, if banked versions of the GCS control register 66 are provided for different exception levels). If locking of exception return state is enabled, then at step 154 the processing circuitry 4 checks whether the EXLOCK parameter 58 is set the locked state. If EXLOCK 58 is currently in the locked state then at step 156 a fault is signaled, because this indicates a departure from the usage expected where the exception return state pop instruction should not be executed at the time when EXLOCK is locked. This fault can signal a possible attack attempting to corrupt program flow to cause an incorrect verification of protected exception return state from the GCS data structure 80.

If either locking of exception return state was determined to be disabled at step 152 or EXLOCK 58 is currently in the unlocked state at step 154, then at step 158 the processing circuitry 4 issues one or more memory access requests to pop GCS-protected return state information from a location on the GCS data structure 80 that is determined based on the stack pointer in the GCS pointer register 66 corresponding to the current exception level ELx. At step 160, the GCS stack pointer in register GCSPR_ELx 66 is updated to account for popping of the exception return state from the GCS data structure 80 (e.g. the stack pointer is incremented or decremented in the opposite direction (but by a corresponding amount) to the update made at step 146 of FIG. 10).

Steps 162, 164 and 166 are steps which can optionally be performed in response to the GCS exception return state pop instruction, in an implementation where the GCS exception return state pop instruction also controls the processing circuitry 4 to verify whether intended exception return state information currently stored in the exception return registers 60, 62 matches the GCS-protected exception return state information popped from the GCS data structure 80 at step 158. At step 162, the processing circuitry 4 reads the intended exception return state information represented by the current values in the exception link register 62 and SPSR 60 corresponding to the current exception level ELx. The term "intended" exception return state information is used to refer to the current values of the exception return state in registers 62, 60 at the time of executing the GCS exception return state pop instruction (which may or may not be the same as the values written to those registers when the corresponding exception entry took place). At step 164, the processing circuitry 4 determines whether the intended exception return state information obtained from the registers 60, 62 matches the GCS-protected exception return state information read from the GCS data structure 80 stored in the protected GCS region of memory, and if there is a mismatch then at step 166 a fault is signaled.

If the intended exception return state information matches the GCS-protected exception return state information at step 164, or if steps 162, 164, 166 are not implemented as the GCS exception return state pop instruction does not trigger a verification (but instead pops the GCS-protected return state information to the exception return state registers 60, 62 directly, for example), then at step 168 the processing circuitry 4 checks whether EXLOCKEN 69 indicates that locking of exception return state is enabled, and proceeds to step 170 if locking of exception return state is enabled (or alternatively, the same check performed at step 152 may also cause step 170 to be conditionally performed depending on whether locking of exception return state is enabled or disabled). If locking of exception return state is enabled, then at step 170, the exception return state lock parameter 58 is set to the locked state (this step is skipped if locking of exception return state is disabled).

Figure 12:
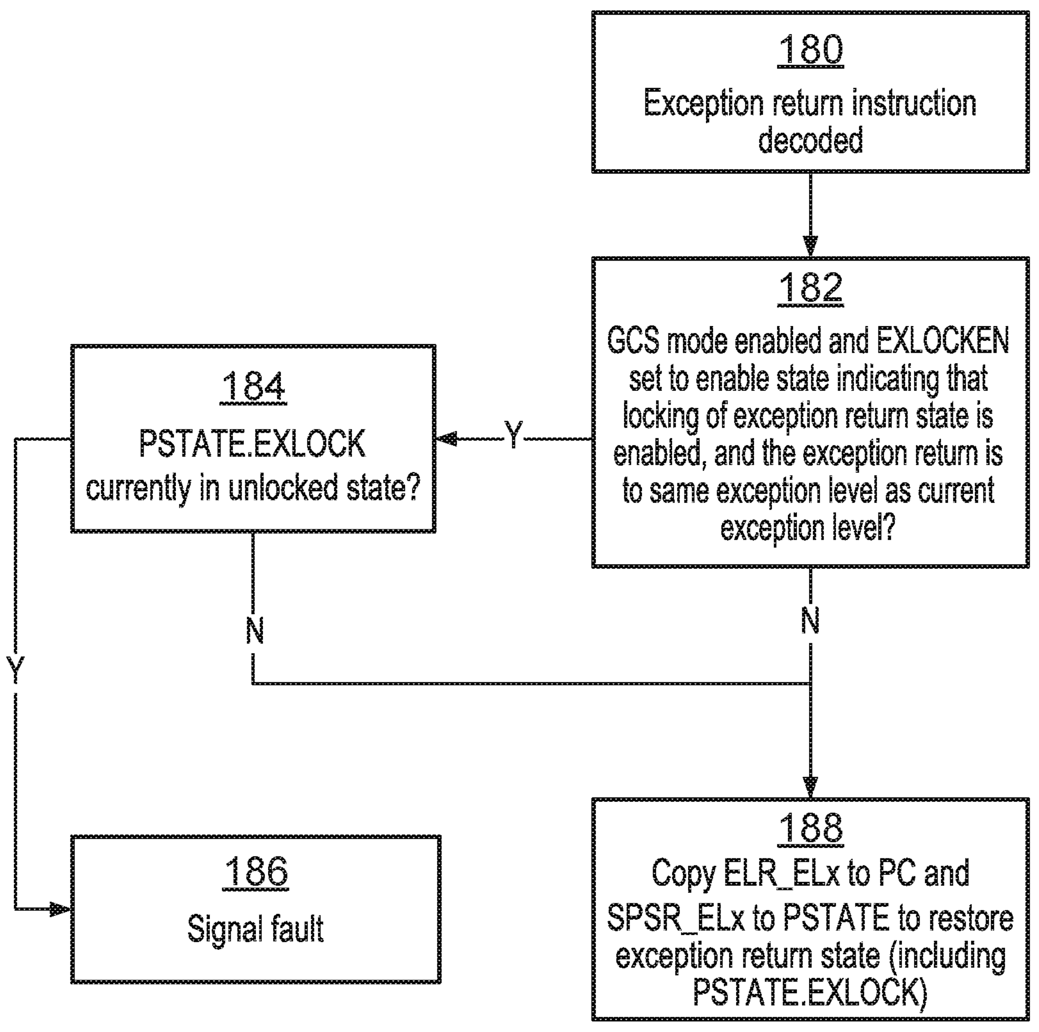
FIG. 12 is a flow diagram showing steps performed in response to an exception return instruction.

FIG. 12 is a flow diagram illustrating steps performed in response to an exception return instruction. At step 180, the instruction decoder 10 decodes an exception return instruction, and in response generates control signals for controlling the processing circuitry 4 (specifically the execute stage 16) to perform the subsequent steps. At step 182 the processing circuitry 4 determines whether the GCS enable parameter 68 indicates that GCS mode is currently enabled, whether the EXLOCKEN parameter 69 indicates that locking of exception return state is also enabled (again, the version of parameters 68, 69 to use for the check at step 182 is the version corresponding to the current exception level, if banked versions of the GCS control register 66 are provided for different exception levels), and whether the exception return is a return to processing in the same exception level as the current exception level. If both the GCS mode and the locking of exception return state are enabled and the exception return is to cause a return to processing performed in the current exception level, then at step 184 the processing circuitry 4 checks whether the EXLOCK parameter 58 is currently in the unlocked state. If EXLOCK 58 is currently in the unlocked state then at step 186 a fault is signaled, because this indicates that the exception return may not have followed a preceding exception return state pop instruction 82 and so it may not be safe to perform an exception return using potentially unsafe exception return state specified in registers 60, 62.

If either the GCS mode is currently disabled, or the EXLOCKEN parameter 69 is set to disable locking of exception return state, or the exception return is to a less privileged exception level than the current exception level, or the EXLOCK parameter 58 is currently in the locked state, then the exception return can proceed, then at step 188 the exception return address is copied from ELR_ELx 62 to the program counter register 52 and the saved processor state is copied from SPSR_ELx 60 to the PSTATE register 54. Note that as the EXLOCK parameter 58 is part of the processor state saved on an exception and restored on an exception return, step 188 can change the exception return state locking parameter 58 to the same state indicated by EXLOCK 58 at the time of taking the corresponding exception. Hence, whether EXLOCK 58 is in the locked state or the unlocked state after the exception return will depend on the state of EXLOCK when the corresponding exception was taken.

Figure 13:
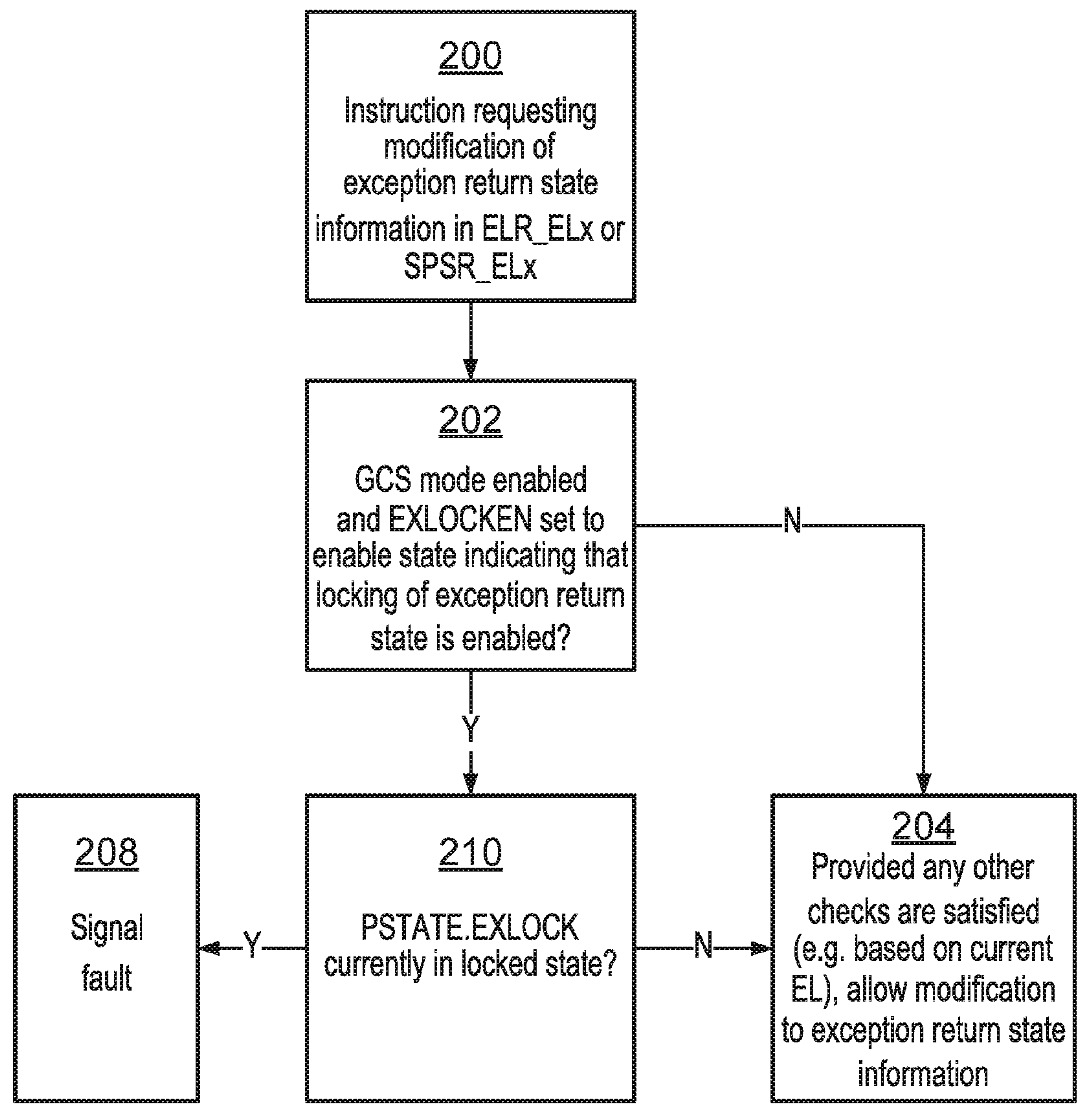
FIGS. 13 and 14 are flow diagrams showing two alternative examples of steps performed in response to an instruction requesting modification of exception return state information stored in exception return state register storage.

FIG. 13 is a flow diagram showing steps for controlling whether a modification of exception return state information in registers 60, 62 can be allowed. At step 200 instruction decoder 10 decodes an instruction requesting a modification of the exception return state information (e.g. exception return address or saved processor state) in one or both of the exception link register 62 or saved processor state register 60 associated with a target exception level (the target exception level may or may not be the current exception level 56, as it is possible for instructions executed at a more privileged exception level to modify the exception return state associated with the less privileged exception level). At step 202, the processing circuitry 4 determines whether the GCS mode as indicated as enabled by enable parameter 68 and the EXLOCKEN parameter 69 indicates that locking of exception return state is enabled. If either GCS mode is disabled or locking of exception return status disabled then at step 204, provided any other checks are satisfied (such as checking whether the current exception level has sufficient privilege to allow modification of the specified register), the modification to the exception return state information can be allowed. If at step 202 it is determined that both the GCS mode and the locking of exception return state are enabled, then at step 206 the processing circuitry 4 determines whether the exception return state lock parameter EXLOCK 58 is currently in the locked state. If EXLOCK 58 is in the unlocked state, then again at step 204 the modification can be allowed provided any other checks are satisfied. If at step 206 the EXLOCK parameter 58 is in the locked state, then at step 208 a fault is signaled to prevent modification of the exception return state information (and hence police against attempts to tamper with the exception return state in window A 90 or window B 92 as shown in FIG. 7).

In the example of FIG. 13, the signaling of the fault at step 208 is independent of whether or not the value to be written to the exception return state information in one of registers 60, 62 is the same or different to a previous value stored in that register. Hence, the fault would be signaled even if the execution of the instruction encountered at step 200 would not in fact have caused a change in the exception return state. This approach can be simpler to implement in hardware, because it is not necessary to provide circuit logic to make the fault signaling depend on a read to the registers 60, 62 and comparison against the new value to be written.

Figure 14:
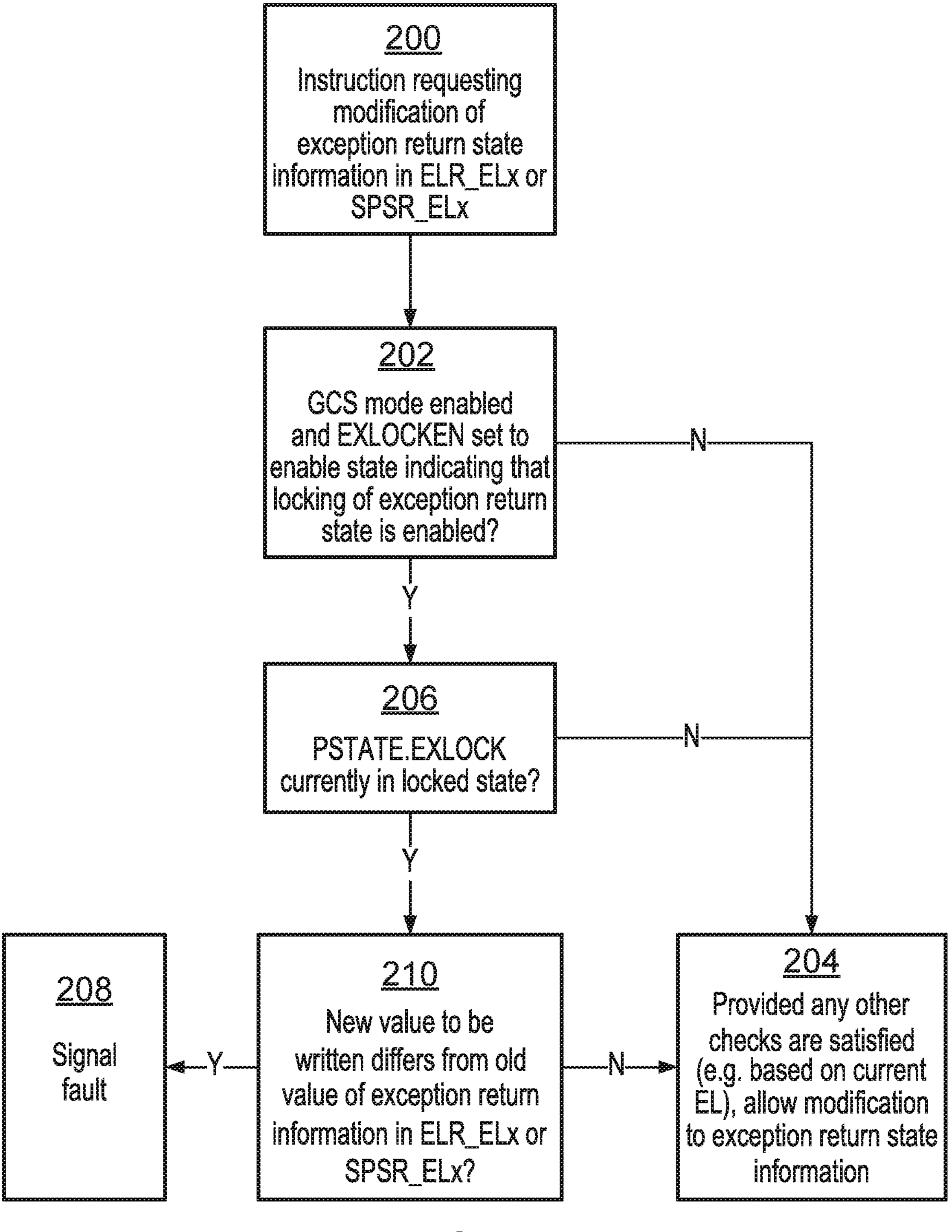

An alternative is shown in FIG. 14. Steps 200, 202, 204, 206 and 208 of FIG. 14 are the same as the corresponding steps in FIG. 13. FIG. 14 comprises an additional check at step 210 which checks whether the new value to be written to one of registers 60, 62 differs from the old value of the exception return state information in that register. If the new value differs from the old value, the fault is signaled at step 208. If the new value is the same as the old value, then at step 204 the attempted "modification" can be allowed as it will not change the exception return state information. This approach can speed up some code paths, e.g. fast exception paths which use a very short exception handling routine (to return from the exception almost immediately after taking the exception) and so do not need to save/restore exception return state to memory, reducing the risk of tampering by an attacker. For such fast exception code paths, the GCS exception return state push/pop instructions may not be used and so EXLOCK may remain set throughout the exception routine. If the exception handling routine nevertheless executes a system register modifying instruction which tries to modify the exception return state in registers 60, 62 (unlikely, but possible), the corresponding fault which would be triggered while EXLOCK is locked can be avoided in cases when the new value written by the system register modifying instruction is actually the same as the old value so that there is no risk of corrupting the exception return state. This can help to improve performance for such code paths.

While the flow diagrams discussed above show steps performed in a certain sequential order, it will be appreciated that the same functions could also be performed in a different order, or at least partially in parallel.

Figure 15:
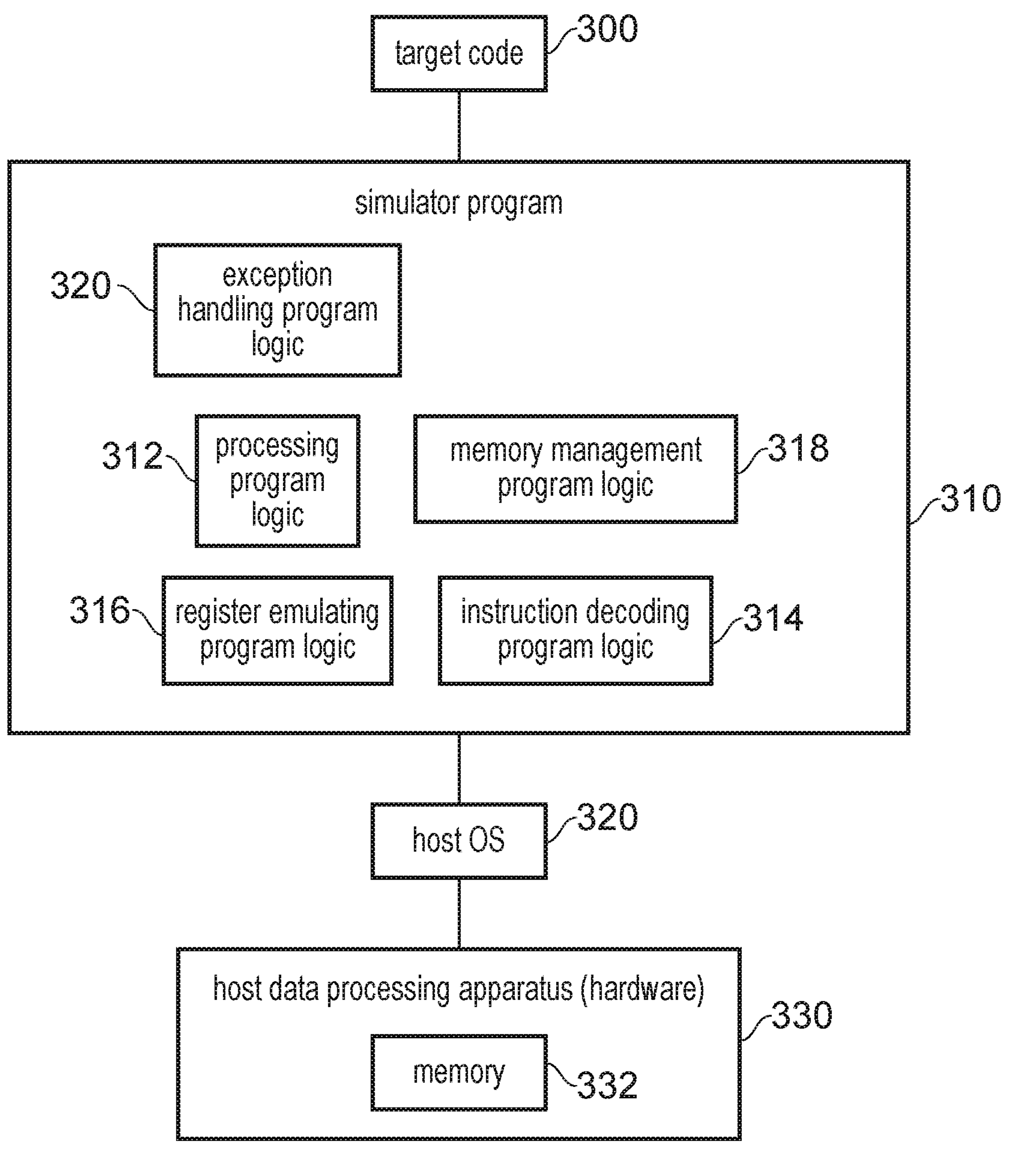
FIG. 15 illustrates a simulator implementation.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 310. Thus, the program instructions of the target code 300, including the GCS-accessing instructions described above, may be executed from within the instruction execution environment using the simulator program 310, so that a host computer 330 which does not actually have the hardware features of the apparatus 2 discussed above can emulate these features. Similarly, the checks based on the EXLOCK parameter 58 can be emulated using the simulator program 310 (e.g. using part of the processing program logic 312 or instruction decoding program logic 314).

Hence, the simulator program 310 may have processing program logic 312 which simulates the state of the processing circuitry 4 described above. For example the processing program logic 312 may control transitions of execution state EL0-EL3 in response to events occurring during simulated execution of the target code 300. Instruction decoding program logic 314 decodes instructions of the target code 300 and maps these to corresponding sets of instructions in the native instruction set of the host apparatus 330. The register emulating program logic 316 maps register accesses requested by the target code to accesses to corresponding data structures maintained on the host hardware of the host apparatus 330, such as by accessing data in registers or memory 332 of the host apparatus 330. Memory management program logic 318 implements address translation, page table walks and access control checking in a corresponding way to the MMU 28 described in the hardware-implemented embodiment above, but also has the additional function of mapping the simulated physical addresses, obtained by the stage-2 mapping in the address translation based on the page tables defined for the target code 300, to host virtual addresses used to access host memory 332. These host virtual addresses may themselves be translated into host physical addresses using the standard address translation mechanisms supported by the host (the translation of host virtual addresses to host physical addresses being outside the scope of what is controlled by the simulator program 310). Exception handling program logic 320 controls handling of simulated exceptions which arise during execution of the target code 300 (including the faults triggered due to the EXLOCK-based checks described above).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

exception return state register storage configured to store exception return state information; and processing circuitry configured to perform processing operations in response to instructions; in which:

in response to a guarded control stack (GCS) exception return state push instruction, the processing circuitry is configured to obtain the exception return state information from the exception return state register storage and push the exception return state information to a GCS data structure;

in response to a GCS exception return state pop instruction, the processing circuitry is configured to obtain GCS-protected exception return state information from the GCS data structure;

the apparatus comprises memory management circuitry configured to reject a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one operating state of the processing circuitry, the processing circuitry is configured to detect, in response to an attempt to modify the exception return state information stored in the exception return state register storage, whether an exception return state lock parameter is in a locked state or an unlocked state, and to signal a fault when the exception return state lock parameter is detected to be in the locked state.

2. The apparatus according to claim 1, in which:

the processing circuitry is configured to perform the processing operations in one of a plurality of exception levels associated with different levels of privilege; and in said at least one operating state of the processing circuitry, the processing circuitry is configured to set the exception return state lock parameter to the locked state in response to an exception being taken for which the exception is to be taken at a same exception level as a current exception level before the exception is taken.

3. The apparatus according to claim 1, in which, in said at least one operating state of the processing circuitry, the processing circuitry is configured to set the exception return state lock parameter to the unlocked state in response to the GCS exception return state push instruction.

4. The apparatus according to claim 1, in which, in said at least one operating state of the processing circuitry, the processing circuitry is configured to set the exception return state lock parameter to the locked state in response to the GCS exception return state pop instruction.

5. The apparatus according to claim 1, in which, in said at least one operating state of the processing circuitry, the processing circuitry is configured to check, in response to an exception return instruction for triggering an exception return based on the exception return state information stored in the exception return state register storage, for which the exception return is a return to processing at a same exception level as a current exception level before the exception return, whether the exception return state lock parameter is set to the locked state, and to signal a fault in response to detecting that the exception return state lock parameter is set to the unlocked state.

6. The apparatus according to claim 1, in which, in said at least one operating state of the processing circuitry, the processing circuitry is configured to signal a fault in response to an attempt to execute an instruction requesting a modification to information in the exception return state register storage when the exception return state lock parameter is set to the locked state, independent of whether a new value to be written to the exception return state register storage is the same or different to an old value previously stored in the exception return state register storage.

7. The apparatus according to claim 1, in which, in said at least one operating state of the processing circuitry, in response to an attempt to execute an instruction requesting a modification to information in the exception return state register storage when the exception return state lock parameter is set to the locked state, the processing circuitry is configured to check whether a new value to be written to the exception return state register storage is the same or different to an old value previously stored in the exception return state register storage, and to signal the fault when the new value is determined to differ from the old value.

8. The apparatus according to claim 1, in which, in response to the GCS exception return state pop instruction, the processing circuitry is configured to signal a fault when a mismatch is detected between intended exception return state information obtained from the exception return state register storage and the GCS-protected exception return state information obtained from the GCS data structure.

9. The apparatus according to claim 1, in which the exception return state register storage comprises an exception return address register to store an exception return address of an instruction to be executed after returning from an exception.

10. The apparatus according to claim 1, in which the exception return state register storage comprises a saved processor state register to store processor state to be restored on returning from an exception.

11. The apparatus according to claim 10, in which in response to taking of an exception, the processing circuitry is configured to copy processor state from a processor state register to the saved processor state register; and the exception return state lock parameter is a parameter specified in the processor state register.

12. The apparatus according to claim 11, in which in response to an exception return instruction, the processing circuitry is configured to copy saved processor state, including a saved exception return state lock parameter, from the saved processor state register to the processor state register, to restore the exception return state lock parameter to a value indicated by the saved exception return state lock parameter.

13. The apparatus according to claim 1, in which said at least one operating state of the processing circuitry comprises an operating state in which an exception-return-state-locking enable control parameter is set to an enable state indicating that locking of exception return state information using the exception return state lock parameter is enabled.

14. The apparatus according to claim 1, in which said at least one operating state of the processing circuitry comprises an operating state in which both:

an exception-return-state-locking enable control parameter is set to an enable state indicating that locking of exception return state information using the exception return state lock parameter is enabled; and a GCS-enable parameter is set to an enable state indicating that a GCS mode for supporting use of the GCS data structure is enabled.

15. The apparatus according to claim 1, in which the memory management circuitry is configured to reject a GCS memory access request specifying a given target address in response to determining that a memory region corresponding to the given target address is not specified as the GCS region.

16. A method comprising:

storing exception return state information in exception return state register storage; and using processing circuitry, performing processing operations in response to instructions;

in response to a guarded control stack (GCS) exception return state push instruction, obtaining the exception return state information from the exception return state register storage and pushing the exception return state information to a GCS data structure;

in response to a GCS exception return state pop instruction, obtaining GCS-protected exception return state information from the GCS data structure;

rejecting a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one operating state of the processing circuitry, detecting, in response to an attempt to modify the exception return state information stored in the exception return state register storage, whether an exception return state lock parameter is in a locked state or an unlocked state, and signalling a fault when the exception return state lock parameter is detected to be in the locked state.

17. A non-transitory, computer-readable storage medium storing a computer program comprising instructions which, when executed by a host data processing apparatus, control the host data processing apparatus to provide an instruction execution environment for executing target code, the computer program comprising:

register emulating program logic to control the host data processing apparatus to simulate exception return state register storage for storing exception return state information; and processing program logic to control the host data processing apparatus to simulate execution of instructions of the target code; in which:

in response to a guarded control stack (GCS) exception return state push instruction of the target code, the processing program logic is configured to control the host data processing apparatus to obtain the exception return state information from the simulated exception return state register storage and push the exception return state information to a GCS data structure;

in response to a GCS exception return state pop instruction of the target code, the processing program logic is configured to obtain GCS-protected exception return state information obtained from the GCS data structure;

the computer program comprises memory management program logic to reject a write request specifying a target address in response to determining that a memory region corresponding to the target address is specified as a GCS region for storing the GCS data structure and the write request is a request other than a GCS memory access request triggered by one of a restricted subset of GCS-accessing types of instruction, the restricted subset of GCS-accessing types of instruction including at least the GCS exception return state push instruction; and in at least one simulated operating state of the processing program logic, the processing program logic is configured to control the host data processing apparatus to detect, in response to an attempt to modify the exception return state information stored in the simulated exception return state register storage, whether an exception return state lock parameter is in a locked state or an unlocked state, and to signal a fault when the exception return state lock parameter is detected to be in the locked state.

* * * * *